US009305436B2

(12) United States Patent
Mizue

(10) Patent No.: US 9,305,436 B2
(45) Date of Patent: Apr. 5, 2016

(54) GAMING MACHINE

(71) Applicant: Konami Gaming, Inc., Las Vegas, NV (US)

(72) Inventor: Hayato Mizue, Tokyo (JP)

(73) Assignee: KONAMI GAMING, INC., Las Vegas, NV (US)

(*) Notice: Subject to any disclaimer, the term of this patent is extended or adjusted under 35 U.S.C. 154(b) by 0 days.

(21) Appl. No.: 13/910,781

(22) Filed: Jun. 5, 2013

(65) Prior Publication Data

US 2013/0288775 A1 Oct. 31, 2013

Related U.S. Application Data

(63) Continuation of application No. 12/723,584, filed on Mar. 12, 2010, now abandoned.

(51) Int. Cl.

| | |
|---|---|
| ***A63F 9/24*** | (2006.01) |
| ***A63F 13/00*** | (2014.01) |
| ***G07F 17/00*** | (2006.01) |
| ***G07F 19/00*** | (2006.01) |
| ***G07F 17/34*** | (2006.01) |
| *G07F 17/32* | (2006.01) |

(52) U.S. Cl.

CPC ............ *G07F 17/34* (2013.01); *G07F 17/3211* (2013.01); *G07F 17/3213* (2013.01); *G07F 17/32* (2013.01)

(58) Field of Classification Search

CPC .. G07F 17/3213; G07F 17/3211; G07F 17/34

USPC ..................................................... 463/16, 20

See application file for complete search history.

(56) References Cited

U.S. PATENT DOCUMENTS

| | | | |
|---|---|---|---|
| 5,395,111 A | 3/1995 | Inoue | |
| 7,473,173 B2 | 1/2009 | Peterson et al. | |
| 2008/0287178 A1* | 11/2008 | Berman et al. | 463/20 |

OTHER PUBLICATIONS

Australian Patent Examination Report No. 1—Date of Issue Oct. 15, 2013.

* cited by examiner

*Primary Examiner* — Milap Shah
*Assistant Examiner* — Jason Pinheiro
(74) *Attorney, Agent, or Firm* — Howard & Howard Attorneys PLLC

(57) ABSTRACT

In a gaming machine including a symbol region where reels having symbols are arranged in predetermined arrangement. The symbols are displayed in an arranged manner in longitudinal and transverse directions. A reel control unit that independently controls movement and stop of each of the reels, such that the symbols appearing in the symbol region change and a winning determination unit that determines whether the symbols appearing on a valid line set to span the reels form a predetermined winning pattern, when each of the reels is stopped, layers are set in the symbol region, and in the gaming machine, at least one reel is disposed in each layer, a symbol group is provided in at least one specific reel arranged in a specific layer of the layers in such a manner that symbols capable of forming at least portion of the winning pattern are arranged in the symbol group.

33 Claims, 22 Drawing Sheets

GAMING MACHINE

CROSS REFERENCE TO RELATED APPLICATION

This application is a continuation of U.S. patent application Ser. No. 12/723,584, filed Mar. 12, 2010, the disclosure of which is hereby incorporated by reference in its entirety.

TECHNICAL FIELD

The present invention relates to a gaming machine in which plural reels where symbols are arranged are layered and combined.

BACKGROUND ART

As a gaming machine of a type of so-called slot machine for playing competitions as to whether or not a combination of symbols forms a winning pattern, for example, there is known a gaming machine in which inner reels and outer reels are combined, symbols of the inner reels are appropriately appeared in windows of the outer reels to thereby change an appearance configuration of the symbols (for example, refer to patent documents 1 and 2). Patent Literature: U.S. Pat. No. 7,473,173B2 and U.S. Pat. No. 5,395,111A.

In the conventional gaming machines, reels are only layered in the same column. For this reason, a player's expectation for winning may not be sufficiently heightened.

SUMMARY OF THE INVENTION

A gaming machine according to the present invention is configured to include a symbol region in which plural reels having plural symbols are arranged in predetermined arrangement, so that the symbols are displayed in an arranged manner in longitudinal and transverse directions. The gaming machine includes a reel control unit that independently controls movement and stop of each of the reels, such that the symbols appearing in the symbol region change, and a winning determination unit that determines whether the plural symbols appearing on a valid line set to span the plural reels form a predetermined winning pattern, when each of the reels is stopped. In the gaming machine, plural layers are set in the symbol region, at least one reel is disposed in each layer, a symbol group is provided in at least one specific reel arranged in a specific layer of the plural layers in such a manner that plural symbols capable of forming at least portion of the winning pattern are arranged in the symbol group, at least one of the plural symbols capable of forming at least portion of the winning pattern overlaps the other reel in the other layer different from the specific layer, and that the symbol group move integrally with the specific reel, the symbols that are disposed in the symbol group in the specific reel can be viewed from a player, and when the symbol group is stopped on the valid line, the winning determination unit make the symbols disposed in the symbol group be included in a determination target and determines whether the winning pattern is formed.

In the gaming machine according to the present invention, the plural symbols capable of forming at least portion of the winning pattern are previously disposed in the symbol group, at least one symbol in the symbol group overlaps the other reel in the other layer, and the symbols in the symbol group can be viewed from the player. When the symbol group is stopped on the valid line, it is determined whether the winning pattern is formed with the symbols in the symbol group being included in the winning determination target. Since the symbols in the symbol group are integrally moved and stopped, these symbols form at least portion of the winning pattern if such symbols are stopped on the valid line. Accordingly, the winning pattern can be easily formed, as compared with the related art in which only symbols on the reel of one column are layered and some symbols are changed. Accordingly, a player's expectation for winning can be sufficiently heightened.

DESCRIPTION OF EMBODIMENTS

First Embodiment

Figure 1:
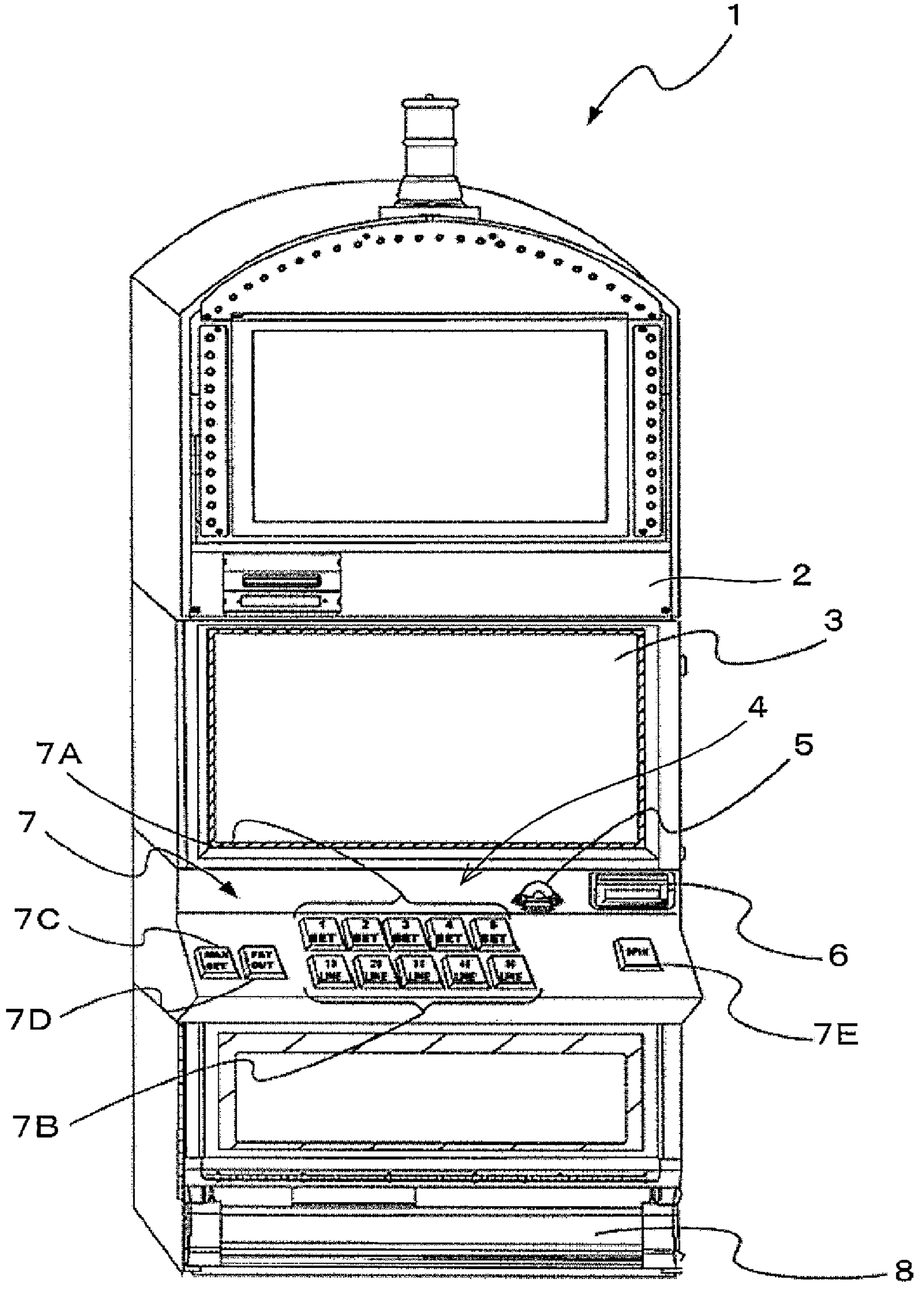
FIG. 1 is a perspective view of a gaming machine according to an embodiment of the invention.

Hereinafter, an embodiment where the invention is applied to a gaming machine of a slot machine type will be described with reference to the accompanying drawings. As illustrated in FIG. 1, a gaming machine 1 according to the embodiment has an upright casing 2 and a display 3 is provided on a foreside of the casing 2. The display 3 is, for example, a liquid crystal display unit. A control panel 4 is provided below the display 3. In the control panel 4, there are provided a coin slot 5 and a bill inlet 6 to deposit coins and bills, which are paid as a price on playing a game, in the gaming machine 1 and an operating device 7 to allow a player to input various instructions to the gaming machine 1. In the operating device 7, there are provided a bet button group 7A to allow the player to instruct the amount of money to be betted by the predetermined unit amount, a line designation button group 7B to designate a line becoming a winning determination target (hereinafter, the line is referred to as a valid line), a maximum betting button 7C to instruct maximum betting, a payout button 7D to instruct the payout, and a spin button 7E to instruct to start a game (start the spin of reels). Below the control panel 4, a payout tray 8 to pay coins or bills is provided.

Figure 2:
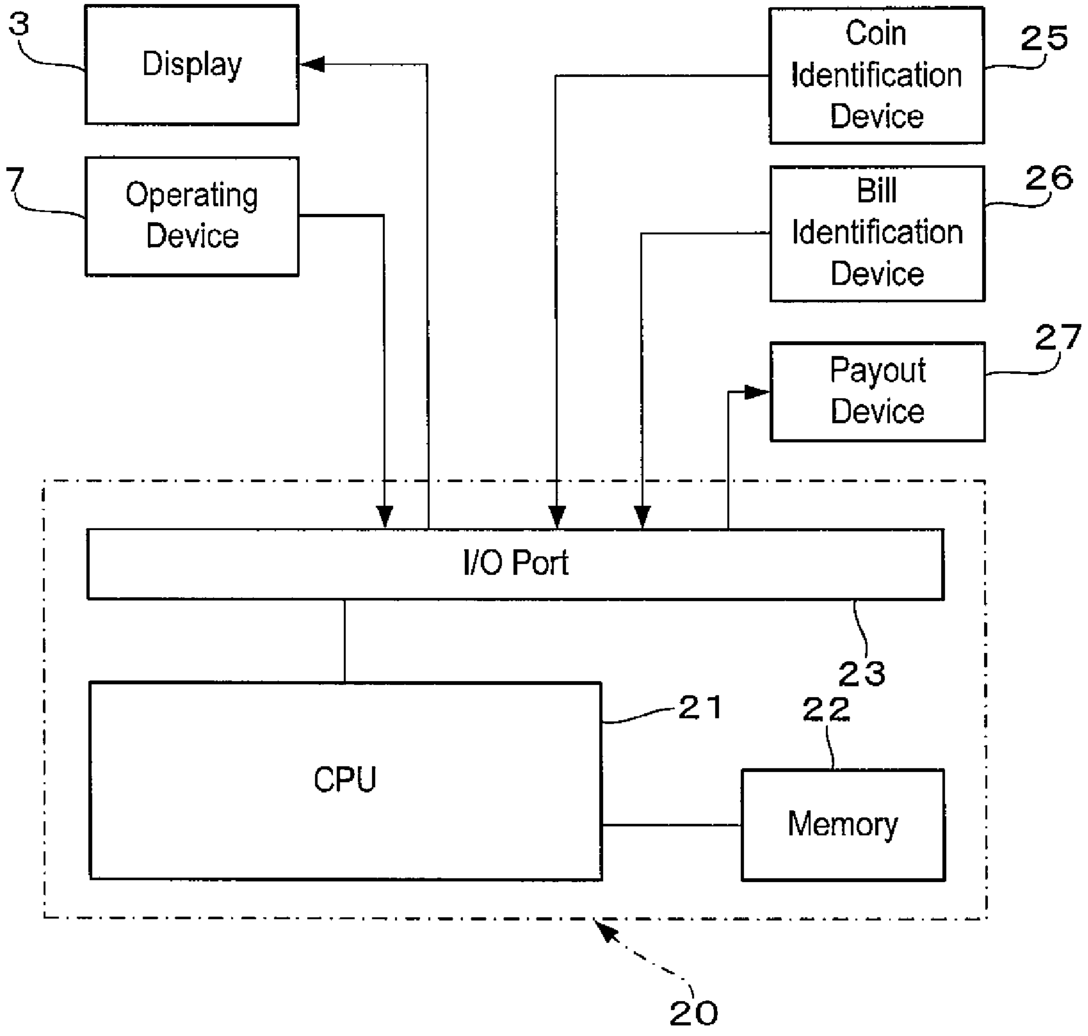
FIG. 2 is a block diagram of a control system in the gaming machine of FIG. 1.

FIG. 2 illustrates the outline of a control system in the gaming machine 1. The gaming machine 1 is provided with a control device 20. The control device 20 is configured as a computer unit including a central processing unit (hereinafter, simply referred to as CPU) 21 and a memory 22 for the CPU 21. The memory 22 includes a nonvolatile storage medium, such as a magnetic or optical storage medium and an EEPROM. The storage medium stores a game program that is needed to execute a game and game data that is referred to by the game program. The CPU 21 progress a slot game in a predetermined sequence by reading and executing the game program.

The display 3 and the operating device 7 are connected to the CPU 21 through an input/output port (I/O port) 23. Further to the CPU 21, there are connected a coin identification device 25, a bill identification device 26, and a payout device 27 through the I/O port 23. The coin identification device 25 identifies coins inserted from the coin slot 5 and outputs a signal according to the identified amount to the CPU 21. The bill identification device 26 identifies bills inserted from the bill inlet 6 and outputs a signal according to the identified amount to the CPU 21. The payout device 27 manages the payout of the coins or bills to the payout tray 8 according to an instruction to be output from the CPU 21. In addition, devices needed to execute a slot game are appropriately connected to the control device 20, which is not illustrated in the drawings.

Figure 3:
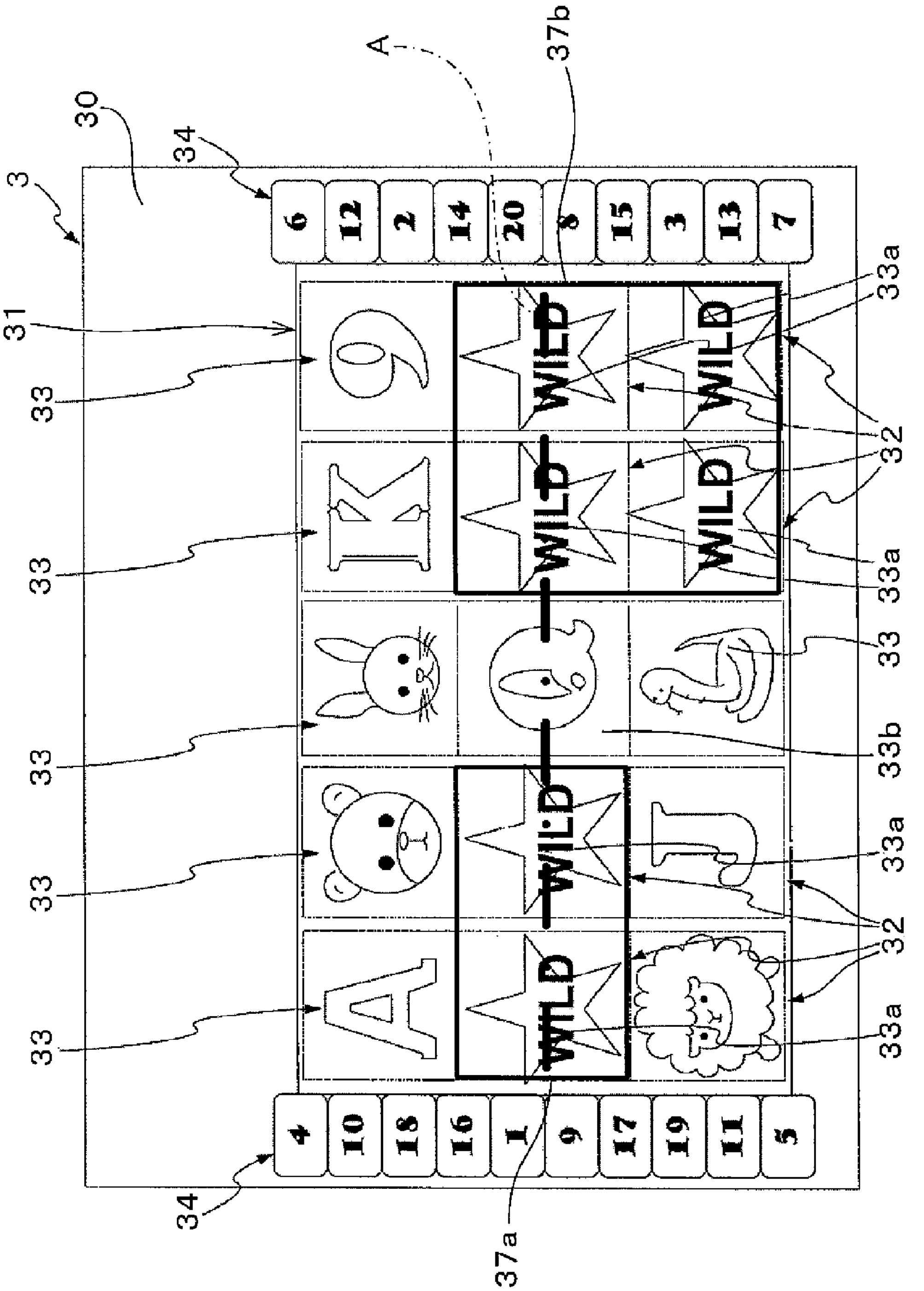
FIG. 3 is a diagram illustrating an example of a symbol region that is displayed on a screen of a display.

FIG. 3 illustrates an example of a game screen that is displayed on the display 3 according to the control of the CPU 21. On a game screen 30 of FIG. 3, a symbol region 31 is provided. As illustrated by a one-dot chain line in FIG. 3, the symbol region 31 is defined such that plural cells 32 serving as symbol stop positions form a matrix of 3.times.5 in longitudinal and transverse directions. In the following description, the transverse direction in the game screen 30 may be referred to as a row direction and the longitudinal direction may be referred to as a column direction. Boundary lines of the cells 32 that are illustrated by the one-dot chain line in FIG. 3 may be displayed on the display 3 in an aspect where a player may visually grasp the lines or may not be displayed. That is, the cells 32 may be logically or ideally defined in the gaming machine 1 as the symbol stop positions, and the boundaries thereof do not need to be viewed.

In the symbol region 31, symbols 33 are displayed for respective cells 32. These symbols 33 are arranged on plural virtual reels, respectively. By arranging the reels in the predetermined arrangement, the symbols 33 are displayed in the symbol region 31 in a state where the symbols 33 are arranged in a matrix in longitudinal and transverse directions. The details of the reels will be described below. As the symbol 33, a numeral, a character, and a figure such as a sheep or a rabbit is appropriately adopted. A symbol 33*a* (hereinafter, referred to as WILD symbol) to which a character of "WILD" is added serves as a universal symbol that can be used as the other symbols 33, in a winning determination. In the following description, when the symbols 33 need to be classified according to kinds thereof, suffixes a, b, . . . are added to the reference numerals 33 and the symbols are denoted by reference numerals 33*a*, 33*b*, . . . . When the symbols 33 do not need to be classified, the symbols are denoted by the reference numerals 33 without using the suffixes.

On both sides of the symbol region 31, valid line display regions 34 that indicate valid lines are provided. The valid line is a line to designate the plural cells 32 becoming a winning determination target in the slot game and is set to span plural inner reels 35 (see FIG. 4). If the player operates the line designation button group 7B of the operating device 7, the valid line is appropriately set. For example, a horizontal line A that connects all of the cells 32 positioned at the center of the symbol region 31 in a column direction can be set as the valid line. In addition, as the valid lines, a line that extends in a diagonal line direction of the symbol region 31 and a line that draws a V-shape or an inverse V-shape in the symbol region 31 may be set. If the player operates the betting button group 7A, designates the number of bet units (called credits) of a one-time slot game, and selects the valid line by the line designation button group 7B, the CPU 21 recognizes the selected contents. Then, if the player operates the spin button 7E, the CPU moves (scrolls) each symbol 33 in a column direction in the symbol region 31, causes one symbol 33 to appear in one cell 32 at a predetermined stop time, and stops scrolling of the symbols 33. When the symbols 33 are stopped, if the figures of the symbols 33 that are displayed in the cells 32 on the valid line are matched with each other or form a predetermined relationship, it can be determined that a winning pattern is formed.

The display of the symbols 33 is controlled by the CPU 21. The CPU 21 sets plural layers to the symbol region 31, arranges the plural reels where the symbols 33 are disposed on the individual layers in the predetermined arrangement, and synthesizes images of the reels of the individual layers to generate an image of the symbol region 31. When the symbols 33 are scrolled, the CPU 21 independently moves the symbols 33 in the column direction of the game screen 30 using one reel as a unit to thereby realize the scrolling.

Figure 4:
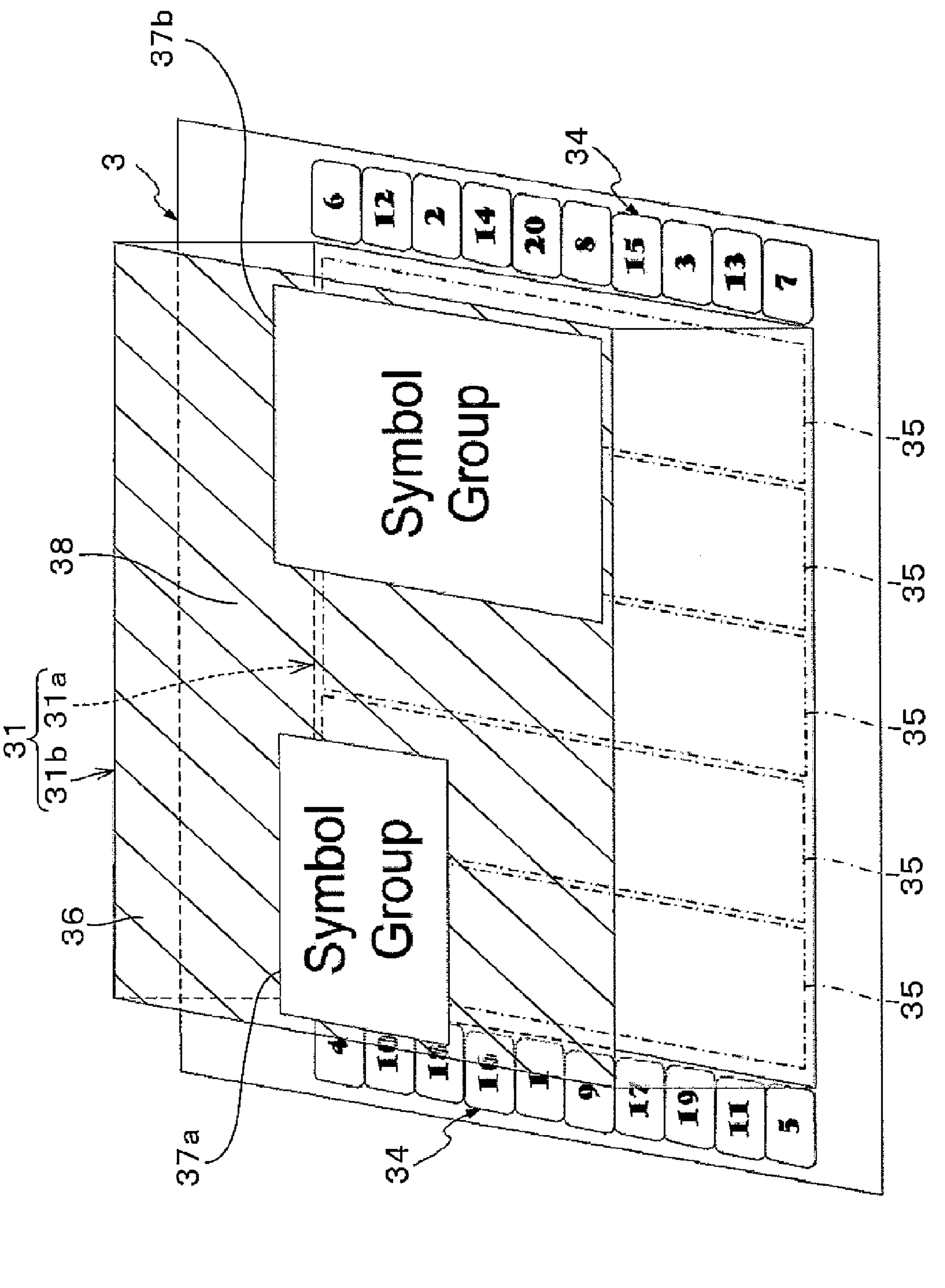
FIG. 4 is a diagram illustrating an example of a relationship between layers of a symbol region and arrangement of reels in the first embodiment.

FIG. 4 illustrates an example of a layer structure of the symbol region 31. In the example illustrated in FIG. 4, the symbol region 31 has a two-layered structure in which the symbol region 31 is divided into the first layer 31*a* and the second layer 31*b*. An upper and lower relationship of the layers 31*a* and 31*b* is set such that the first layer 31*a* becomes the lower side and the second layer 31*b* becomes the upper side, as viewed from the player. In the first layer 31*a*, the five inner reels (first reels) 35 are arranged parallel to each other in the row direction over the entire region of the symbol region 31. Each inner reel 35 has the same width (dimension of the row direction) as one cell 32 and extends along the column direction of the game screen 30. The entire length of the inner reel 35 in the column direction is sufficiently longer than the length of the symbol region 31 in the column direction (that is, the length when the three cells 32 are continuously arranged in the column direction). In the symbol region 31, only a portion of the inner reel 35 is displayed. In each inner reel 35, the symbols 33 are continuously arranged over the entire length of the column direction at the same pitch as the cells 32. The inner reels 35 are scrolled in the column direction independently from each other.

On the other hand, in the second layer 31*b*, a single outer reel (second reel) 36 is disposed. The width of the outer reel 36 in the row direction is the same as the entire width of the symbol region 31 in the row direction. The entire length of the outer reel 36 in the column direction is set to be sufficiently longer than the length of the symbol region 31 in the same direction. That is, the outer reel 36 has a size where the outer reel overlaps all of the inner reels 35 disposed in the symbol region 31. In the outer reel 36, two symbol groups 37*a* and 37*b* are provided. The symbol group 37*a* has a size that corresponds to the two cells 32 continuously arranged in the row direction, and the two symbols 33 of the same kind are disposed therein. Meanwhile, the symbol group 37*b* has a size that corresponds to the four cells 32 continuously arranged in the row and column directions, respectively, and the four symbols 33 of the same kind are disposed therein. The symbols 33 that are disposed in the symbol groups 37*a* and 37*b* may be appropriately selected. For example, the WILD symbols 33*a* may be selected. In the following description, symbol groups (including a modification to be described in detail below) having various shapes or sizes may be denoted by the reference numeral 37.

Figure 5:
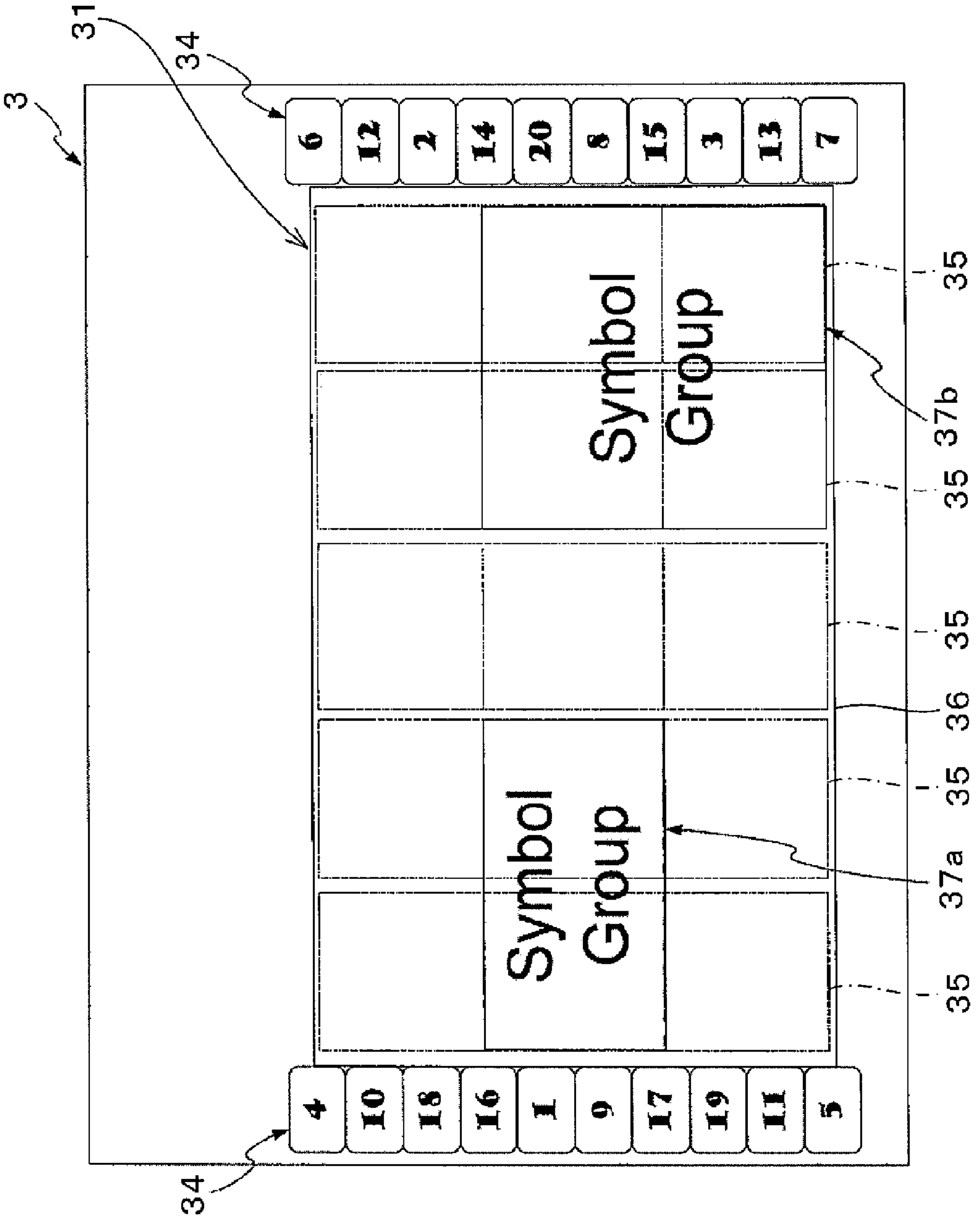
FIG. 5 is a diagram illustrating a state where a symbol group of an outer reel overlaps an inner reel.

The region except the symbol groups 37*a* and 37*b* of the outer reel 36 is set to a transparent region 38 (hatched region in FIG. 4). The transparent region 38 is a portion of the outer reel 36. However, a transparent attribute is set to an image synthesis, and the symbols 33 of the inner reel 35 can be viewed through the transparent region 38. That is, as illustrated in FIG. 5, the outer reel 36 is overlapped to the inner reels 35, resulting in that the symbol groups 37*a* and 37*b* are displayed to partially cover the inner reels 35 that overlap the symbol groups. On the other hand, the inner reels 35 appear on the symbol region 31 in a range overlapping the transparent region 38, and the symbols 33 that are disposed on the inner reels 35 can be viewed from the player. In the example illustrated in FIG. 3, the WILD symbols 33*a* of the symbol groups 37*a* and 37*b* are displayed, and the symbols 33 that are disposed on the inner reels 35 are viewed in a portion of the transparent region 38. If the central row is assumed as the valid line A, on the valid line A, the four WILD symbols 33*a* of the symbol group 37 are arranged. In the remaining one cell 32, there is appeared a symbol 33*b* where an alphabet Q of the inner reel 35 is displayed. In this case, it is determined that a winning pattern where the five symbols 33*b* are arranged is formed. The symbol groups 37*a* and 37*b* and the transparent region 38 of the outer reel 36 are integrally scrolled in the column direction independently from the inner reels 35.

Figure 6A:
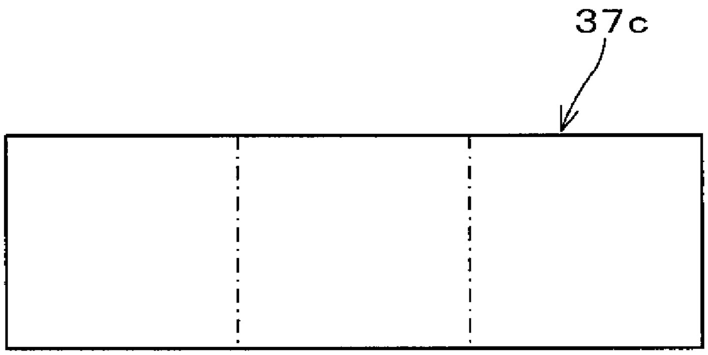
FIG. 6A is a diagram illustrating an example of the case where a symbol group is disposed in a row direction.
Figure 6B:
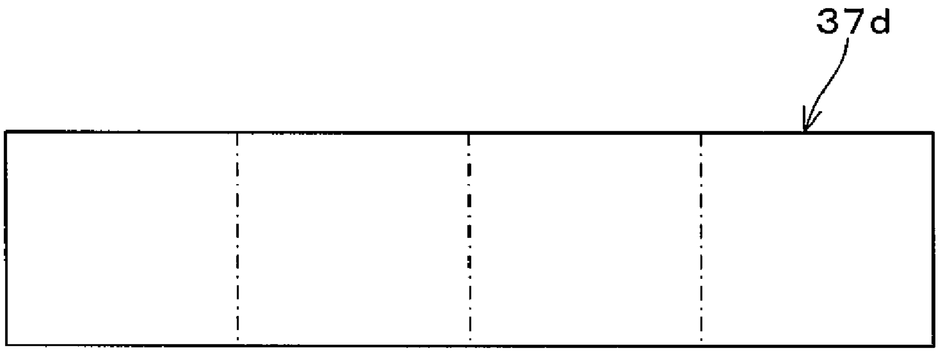
FIG. 6B is a diagram illustrating another example of the case where a symbol group is disposed in a row direction.
Figure 6C:
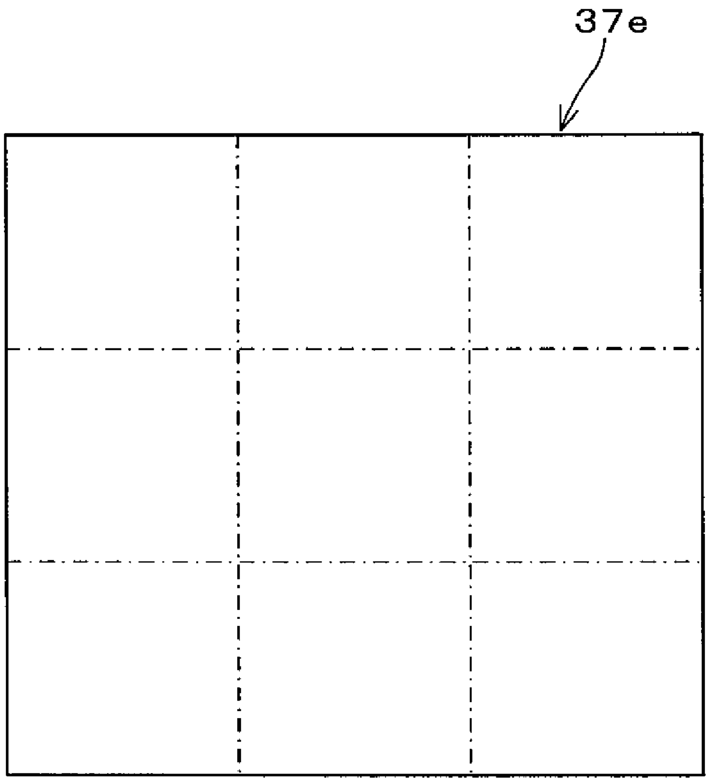
FIG. 6C is a diagram illustrating an example of the case where a symbol group is disposed like a block in row and column directions.
Figure 6D:
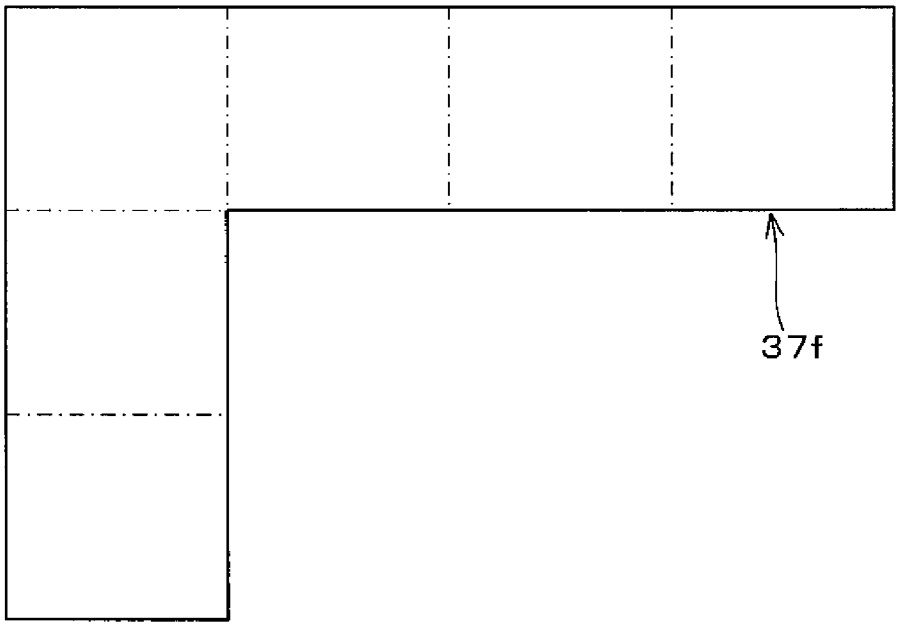
FIG. 6D is a diagram illustrating an example of the case where a symbol group is formed in an L shape.
Figure 6E:
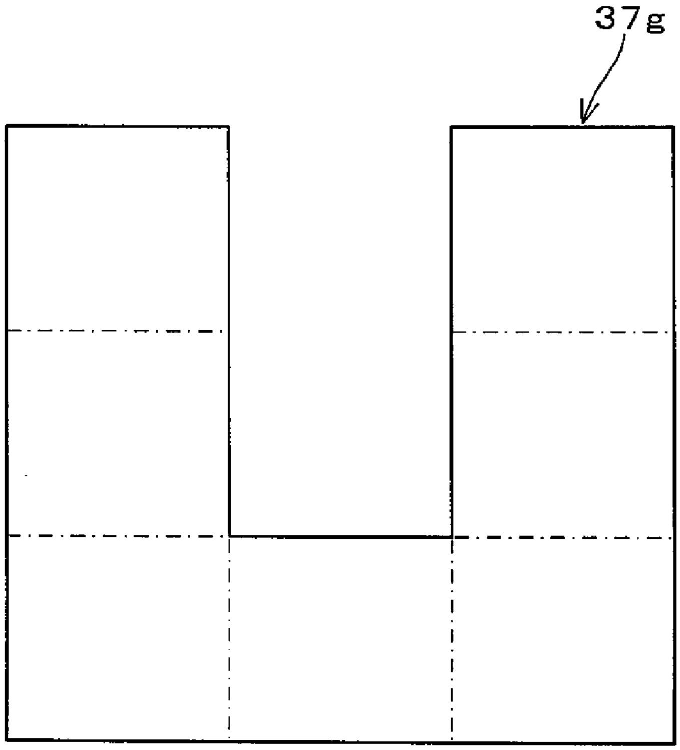
FIG. 6E is a diagram illustrating an example of the case where a symbol group is further deformed.

The above-described configuration of the outer reel 36 is only exemplary. For example, the size and the shape of the symbol group 37 may be appropriately changed. Various modifications can be made in such a manner that, as illustrated in FIGS. 6A and 6B, symbol groups 37*c* and 37*d* having a size where the three or more cells 32 are continuously arranged in the row direction, as illustrated in FIG. 6C, a symbol group 37*e* having a block shape of a size where the plural cells 32 (nine cells) are continuously arranged in the row and column directions, as illustrated in FIG. 6D, a symbol group 37*f* having a shape where the cells 32 are continuously arranged in an L-shape, and as illustrated in FIG. 6E, a symbol group 37*g* having a shape where the plural cells 32 are appropriately combined in the row and column directions. When the symbol group 37 is set to have the size over the plural cells 32 in regard to the column direction, the probability of a winning pattern being formed by the symbols 33 of the symbol group 37 can be increased.

Figure 7:
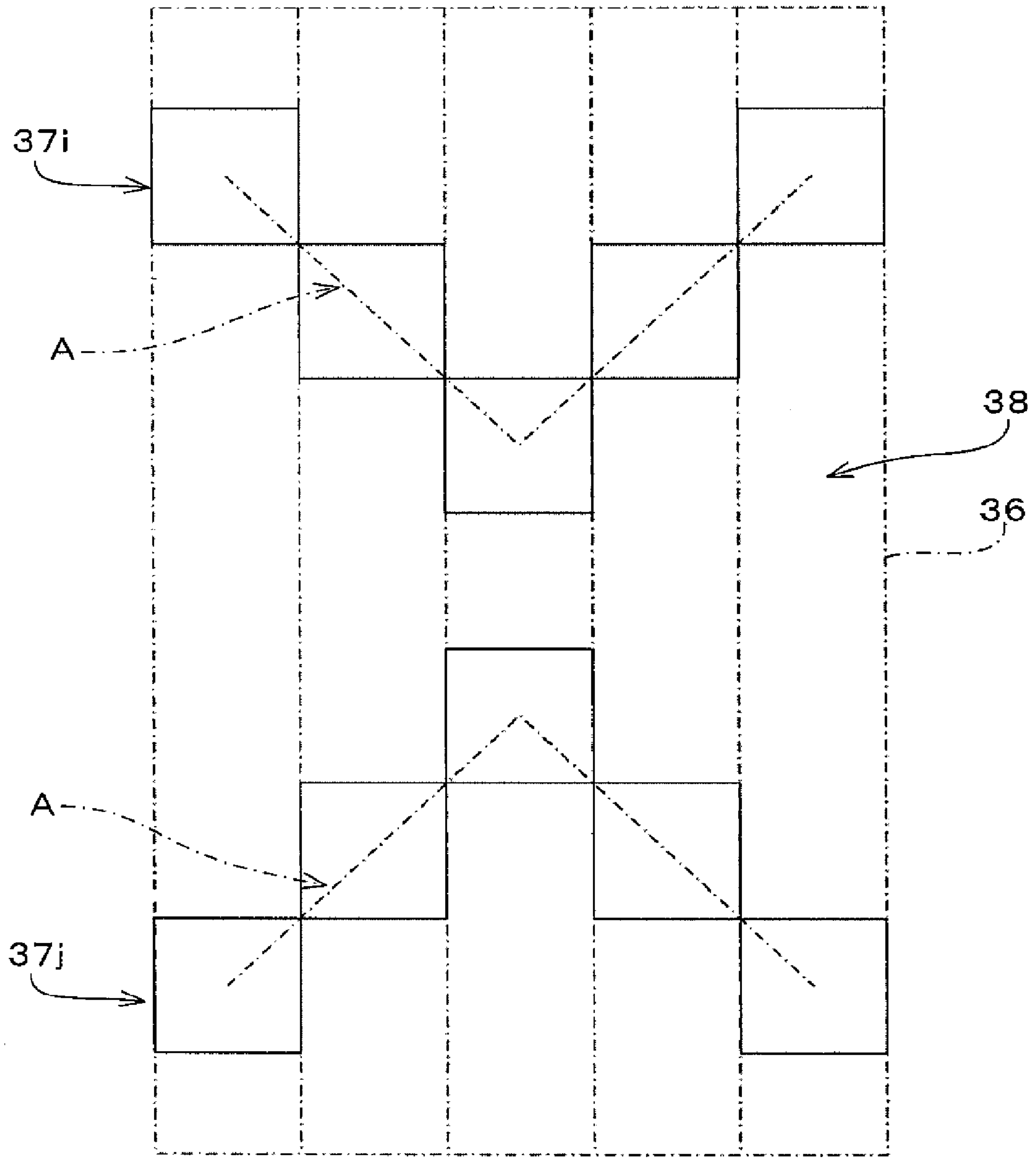
FIG. 7 is a diagram illustrating an example of the case where a symbol group is disposed to be capable of forming a winning pattern.
Figure 8:
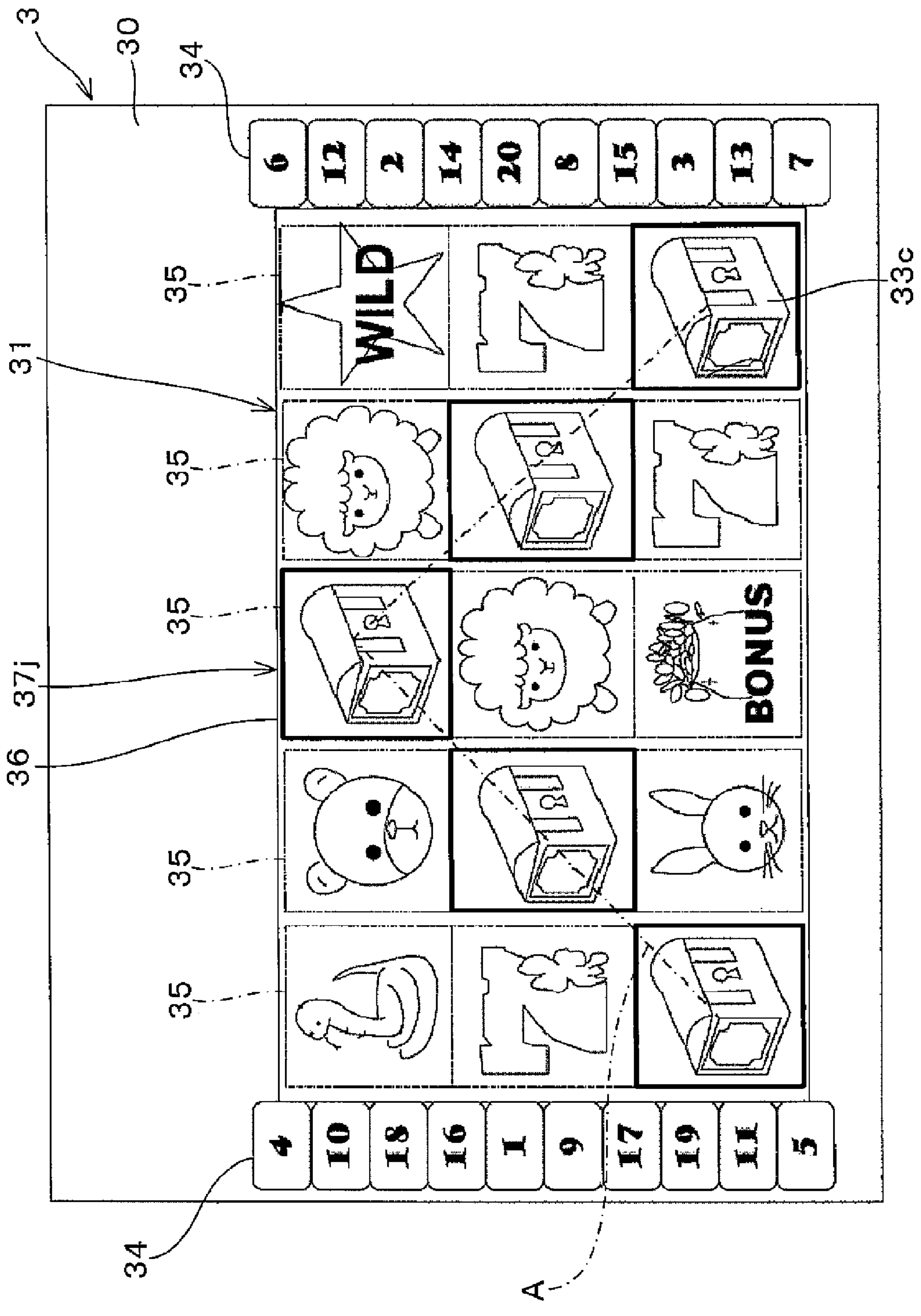
FIG. 8 is a diagram illustrating a symbol region when the winning pattern is formed by the symbol group of FIG. 7.

The symbol group 37 does not need to have a shape where the cells 32 are continuously arranged in the row direction or the column direction. For example, as illustrated in FIG. 7, symbols groups 37*i* and 37*j* having a shape where the cells 32 are arranged in the V-shape or the inverse V-shape becoming the valid line A may be provided. That is, the symbol group 37 having a shape that corresponds to a group of cells 32 of the arrangement capable of constituting the valid line may be provided. In this case, as illustrated in FIG. 8, if the outer reel 36 is stopped such that the symbol group 37*i* or 37*j* appears in the symbol region 31, a winning pattern can be formed by only the symbols 33 disposed in the symbol group 37 of the outer reel 36, regardless of the stop positions of the inner reels 35. In the example illustrated in FIG. 8, symbols 33*c* where figures of a treasure box are displayed are arranged on the valid line A, and it is determined that a winning pattern is formed.

Figure 9B:
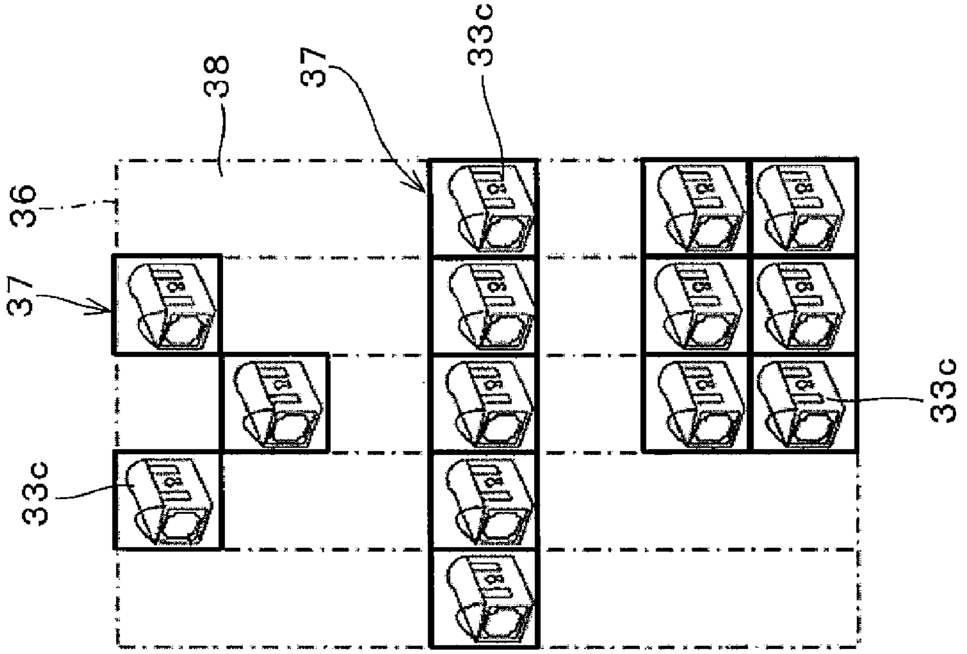
FIG. 9B is a diagram illustrating an example of the case where symbols of a figure are disposed in a symbol group.
Figure 9A:
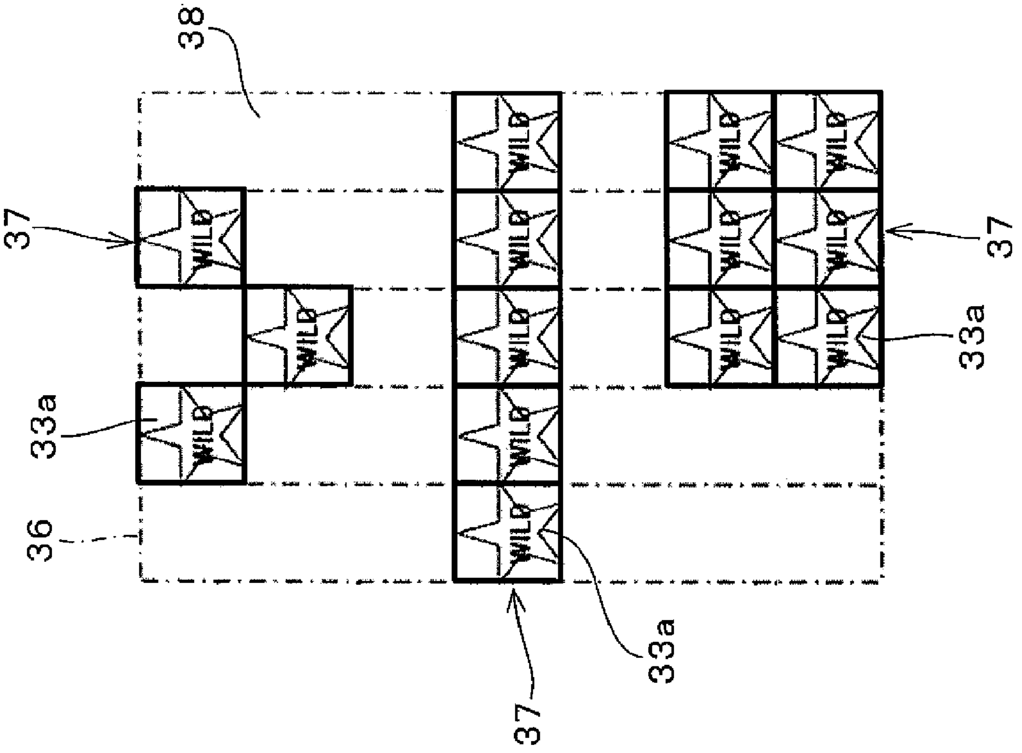
FIG. 9A is a diagram illustrating an example of the case where WILD symbols are disposed in a symbol group.
Figures 9C, 9D:
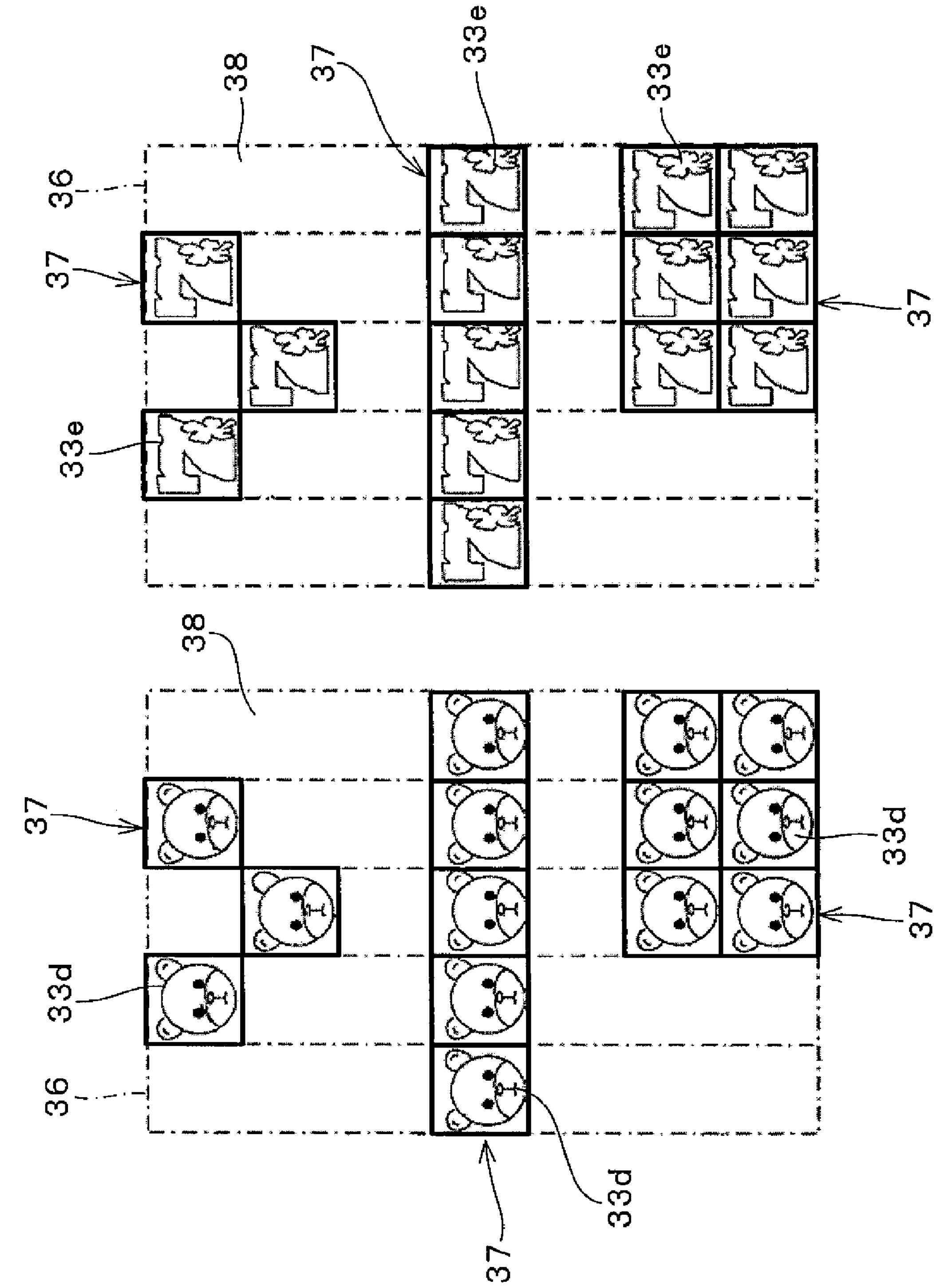
FIG. 9C is a diagram illustrating an example of the case where symbols of another figure are disposed in a symbol group.
FIG. 9D is a diagram illustrating an example of the case where symbols of a numeral are disposed in a symbol group.
Figure 9E:
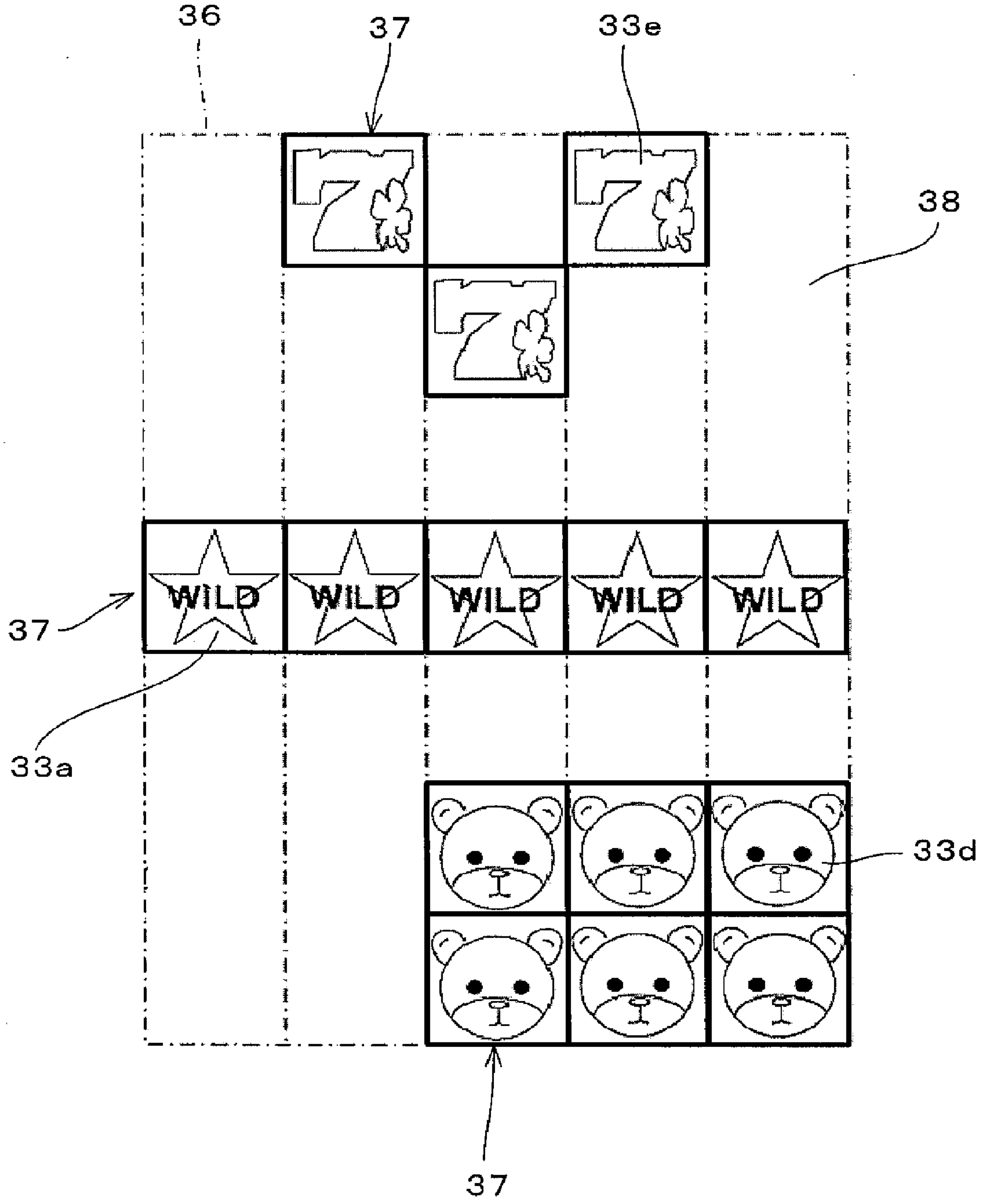
FIG. 9E is a diagram illustrating an example of the case where different symbols are disposed in plural symbol groups, respectively.
Figure 9F:
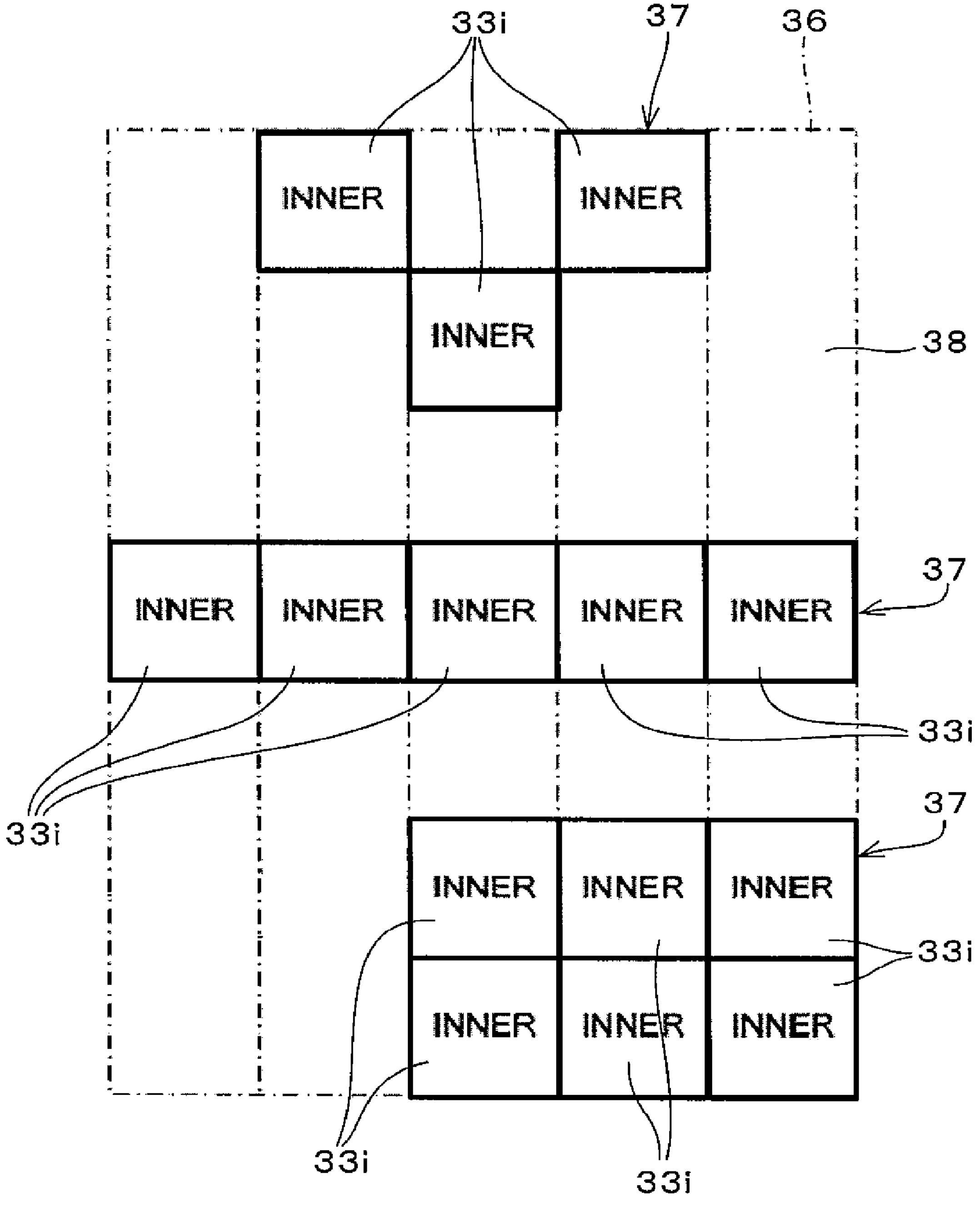
FIG. 9F is a diagram illustrating an example of the case where inner symbols are disposed in a symbol group.

The symbols 33 that are disposed in the symbol group 37 may be appropriately selected. FIGS. 9A to 9D illustrate examples where various symbols 33*a* to 33*d* are arranged. When the WILD symbols 33*a* are disposed in the symbol group 37, the probability that a combination with the symbols 33 on the inner reels 35 forms a winning pattern increases. If a privilege in which the bonus game is allowed to be carried out when the specific symbols 33 of a predetermined number (for example, three) are arranged on the valid line, a player's expectation for acquiring the right to execute the bonus game can be heightened by disposing the specific symbols 33 in the symbol group 37. When the two or more symbol groups 37 are disposed on the outer reel 36, the symbols 33 may become different between the two symbol groups 37. An example thereof is illustrated in FIG. 9E. Further, as illustrated in FIG. 9F, an inner portion of the symbol group 37 may be previously set as inner symbols 33*i* where kinds of the symbol 33 are not fixed, and the symbol 33 of any one kind may be made to appear in each inner symbol 33*i* by lottery, at appropriate timing like when the outer reel 36 is stopped. Even in this case, the same symbols 33 may be allocated to one symbol group 37, and the kinds of the symbols 33 may be different between the symbol groups 37.

Figure 10:
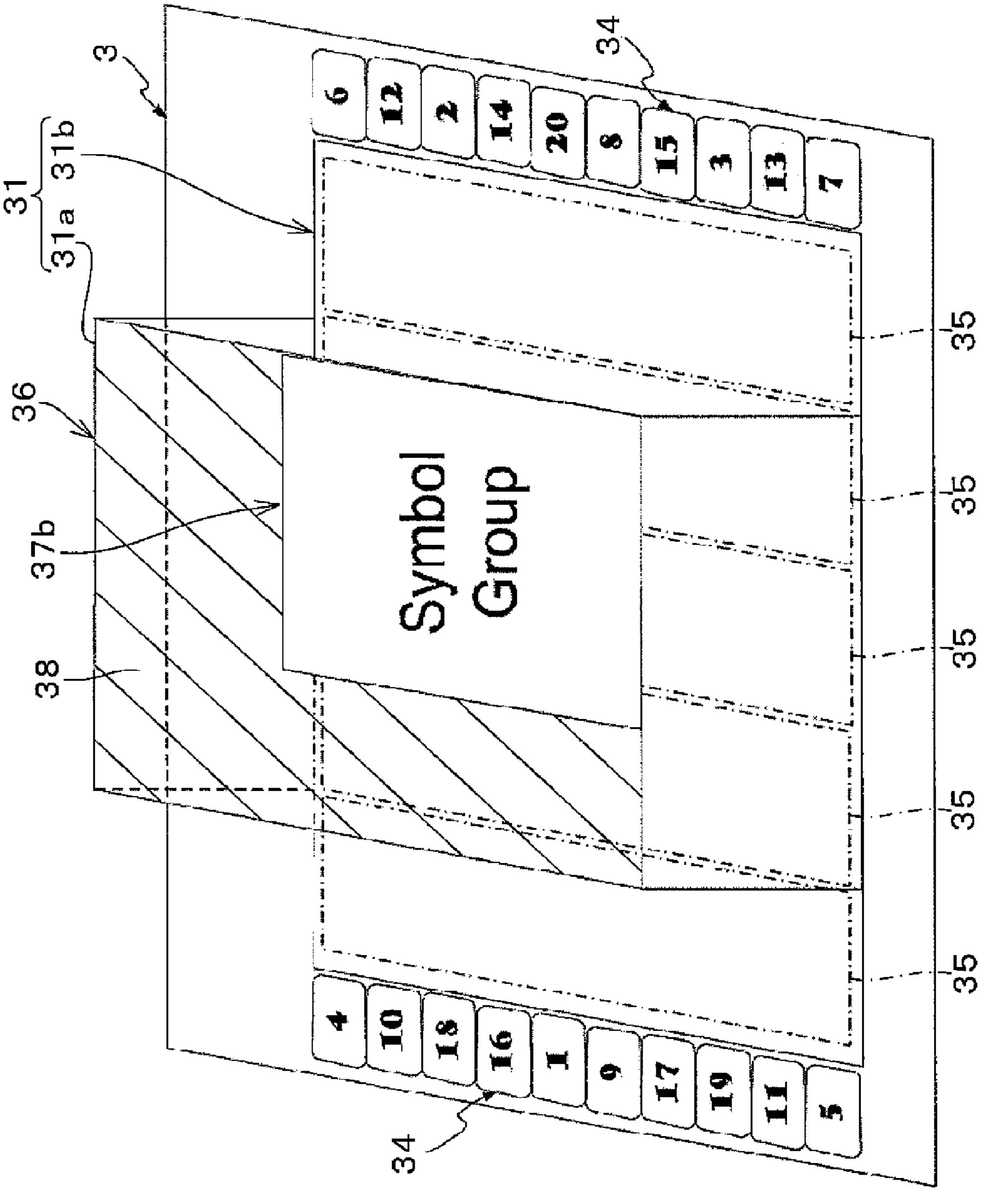
FIG. 10 is a diagram illustrating a modification of FIG. 4.

The outer reel 36 does not need to have a size where the outer reel overlaps all of the inner reels 35 disposed in the symbol region 31. The outer reel 36 may have a size where the outer reel 36 overlaps at least two inner reels 35. In an example illustrated in FIG. 10, the outer reel 36 is disposed so as to overlap the three inner reels 35, that is, the inner reel 35 at the center of the symbol region 31 in the row direction and the inner reels 35 on both sides thereof. The inner reels 35 on both ends in the row direction can be viewed without being obstructed by the symbol group 37 of the outer reel 36.

The above-described arrangement of the symbols 33 in each of the inner reels 35 and the outer reel 36 is previously determined and stored in the memory 22 as a portion of the game data. The CPU 21 controls the display of the inner reels 35 and the outer reel 36 on the game screen 30, referring to the data stored in the memory 22. In this case, since the inner reels 35 are disposed in the first layer 31*a* below the outer reel 36 existing in the second layer 31*b*, images of the inner and outer reels 35 and 36 of the first and second layers 31*a* and 31*b* are synthesized to generate an image of the symbol region 31, such that the portion of the inner reels 35 overlapped by the symbol group 37 is overwritten by the symbols 33 disposed in the symbol group 37 or that the symbols 33 disposed in the symbol group 37 are preferentially displayed.

Figure 11:
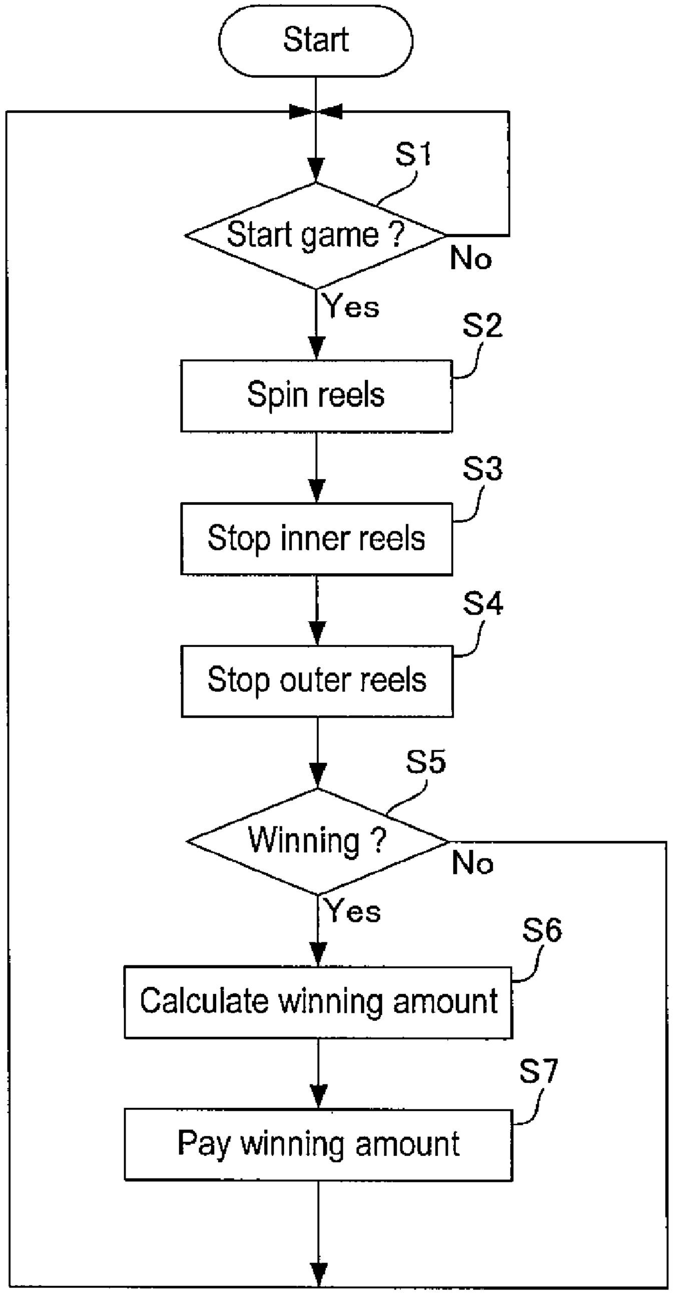
FIG. 11 is a flowchart illustrating a routine that is executed by a CPU according to the first embodiment to realize a slot game.

FIG. 11 is a flowchart illustrating a routine that is executed by the CPU 21 with an appropriate cycle to control the display of the inner and outer reels 35 and 36, when the slot game is executed. When the routine of FIG. 11 starts, first of all, the CPU 21 determines whether the player operates the spin button 7E to thereby determine whether a start of the game is instructed. When the start of the game is not instructed, the determination of step S1 is repeated, and when the start of the game is instructed, the process proceeds to step S2. In step S2, the CPU 21 starts to spin the inner reels 35 and the outer reel 36, that is, scroll the symbols 33 in the column direction. Next, in step S3, the CPU 21 stops the inner reels 35. Then, the CPU 21 proceeds to step S4 and stops the outer reels 36. As such, when the outer reel 36 is stopped later than the inner reels 35, a user's expectation for forming a winning pattern by the symbol groups 37 of the outer reel 36 can be heightened. As a result, amusement of the game can be heightened.

Next, in step S5, the CPU 21 determines whether a combination of the symbols 33 appearing in the cells 32 of the symbol region 31 form a predetermined winning pattern. At this time, with respect to the cells 32 where the symbol group 37 of the outer reel 36 is stopped, instead of the symbols 33 of the inner reels 35, the symbols 33 of the outer reel 36 are selected as a determination target of the winning pattern. When the winning pattern is formed, the CPU 21 proceeds to step S6, calculates the winning amount corresponding to the formed winning pattern. Next, in step S7, the CPU 21 provides the player with credits corresponding to the calculated winning amount. The provided credits can be used at the time of betting of the following slot game. If the player operates the payout button 7D, the winning amount that corresponds to the credits accumulated by the point of time the payout button is operated is paid from the payout device 27 to the payout tray 8. When the provision of the credits is terminated, the process returns to step S1. Even when it is determined in step S5 that the winning pattern is not formed, the process returns to step S1.

In the first embodiment, the second layer 31*b* corresponds to the specific layer and the outer reel 36 corresponds to the specific reel. The first layer 31*a* corresponds to the other layer and the inner reels 35 that is overlapped by the outer reel 36 correspond to the other reels. In the first embodiment, all of the inner reels 35 are disposed in the same layer 31*a*, but the inner reels 35 may be divisionally disposed in plural layers. The plural outer reels 36, each of which serves as the specific reel, may be disposed in the same layer or divisionally disposed in the different layers. The outer reel 36 is not necessarily moved in the same direction (column direction) as the inner reels 35. For example, the outer reel 36 may be moved in the row direction.

Second Embodiment

Next, a second embodiment of the invention will be described. The second embodiment corresponds to the case where the correspondence relationship between the layers and the reels of the symbol region is changed in the first embodiment. Accordingly, the changed portion will be mainly described below, while the components are denoted by the same reference numerals as those of the first embodiment.

Figure 12:
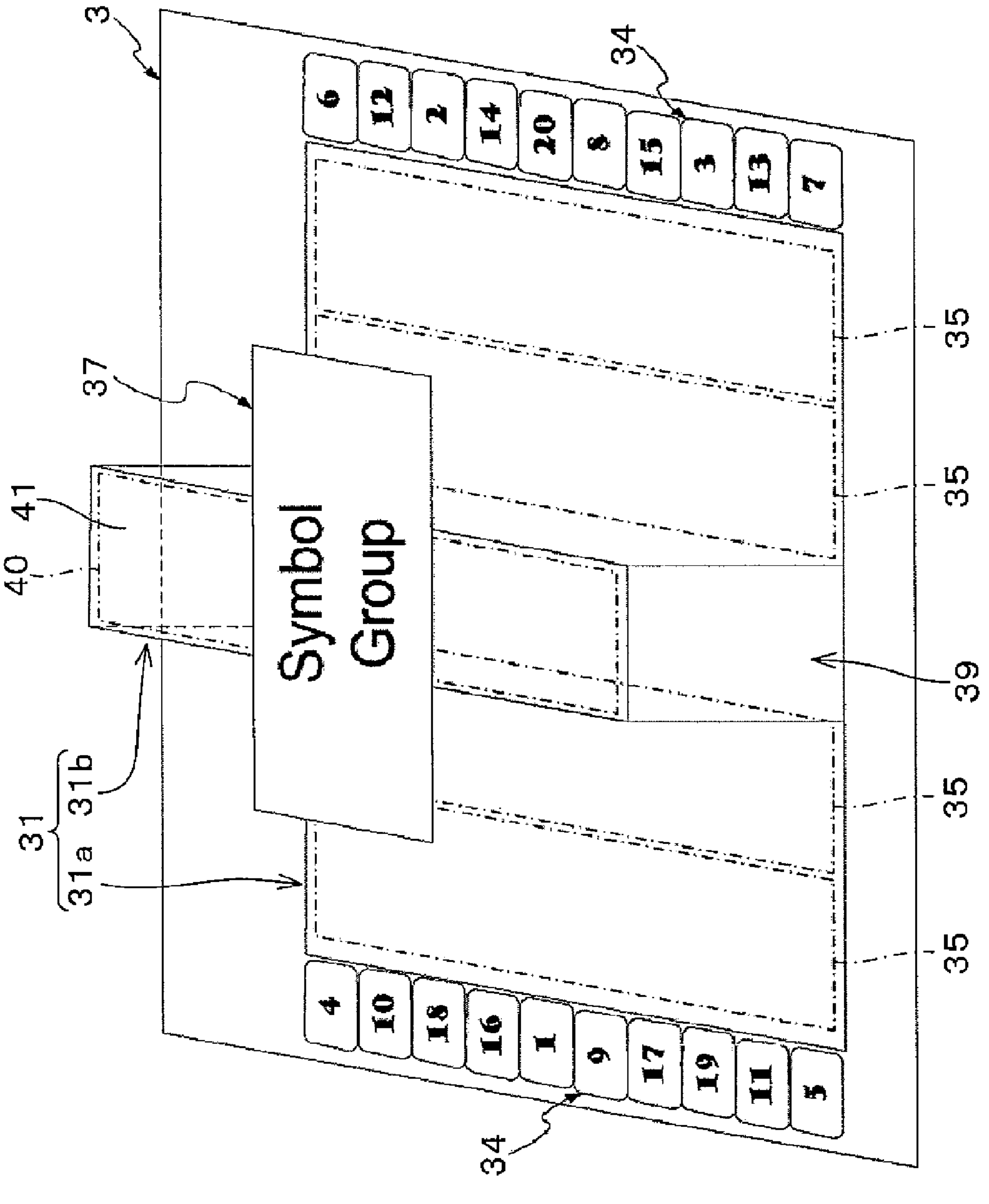
FIG. 12 is a diagram illustrating another example of a relationship between layers of a symbol region and arrangement of reels.

FIG. 12 illustrates a layer structure of a symbol region 31 according to the second embodiment. The second embodiment is the same as the first embodiment in that the first layer 31*a* and the second layer 31*b* are set to the symbol region 31. However, in the first layer 31*a*, the four inner reels 35 are disposed in such a manner that an empty region 39 that corresponds to one inner reel is generated at the center of the row direction. On the other hand, in the second layer 31*b*, one outer reel 40 is disposed to overlap the empty region 39. The inner reel 35 does not exist below the outer reel 40. That is, in the second embodiment, the inner reels 35 and the outer reel 40 are arranged separately into the plural layers 31*a* and 31*b*, such that the inner reels 35 and the outer reel 40 are arranged parallel to each other in the row direction over the entire region of the symbol region 31.

Figure 13:
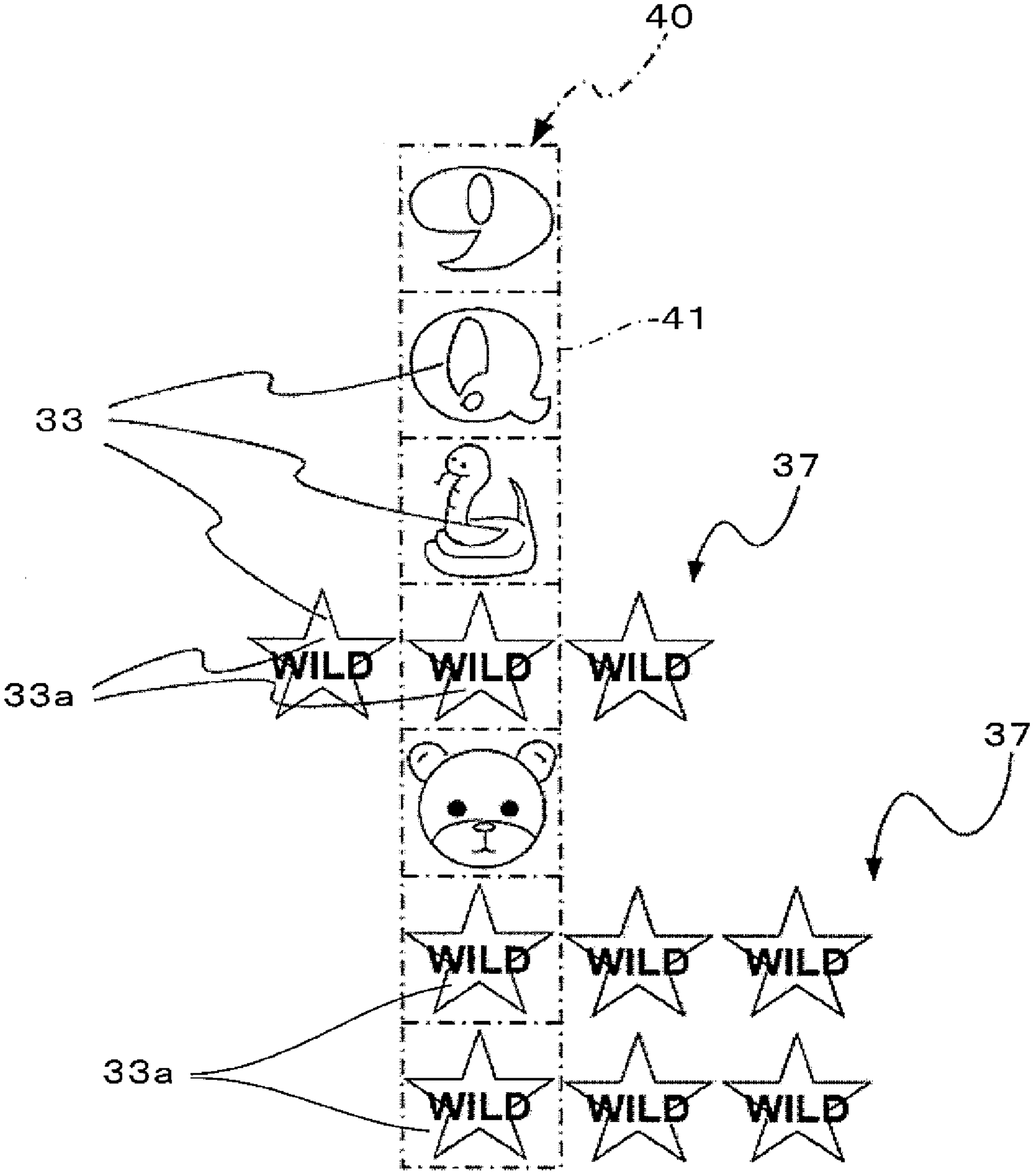
FIG. 13 is a diagram illustrating an example of the configuration of an outer reel of FIG. 11.

The outer reel 40 has a base portion 41 that has the same width as that of the inner reel 35 and a symbol group 37 that is provided to protrude in the row direction from the base portion 41. The symbol group 37 overlaps at least one inner reel 35 (two inner reels in an example illustrated in FIG. 12) of the first layer 31*a*. As also illustrated in FIG. 13, the symbol group 37 has a size corresponding to at least two cells 32 in regard to the row direction, and the symbols 33 of the same kind are disposed in the symbol group 37. In an example illustrated in FIG. 13, the WILD symbols 33*a* are disposed in the symbol group 37*a*. In the base portion 41, various symbols 33 are continuously disposed in the column direction at the same pitch as the cells 32. In summary, the second embodiment corresponds to a modification in which the outer reel 36 in the first embodiment is omitted, at least one of the five inner reels 35 that are disposed in the first layer 31*a* is moved to the second layer 31*b* and used as the outer reel, and the symbol group 37 is provided in the outer reel.

Figure 14:
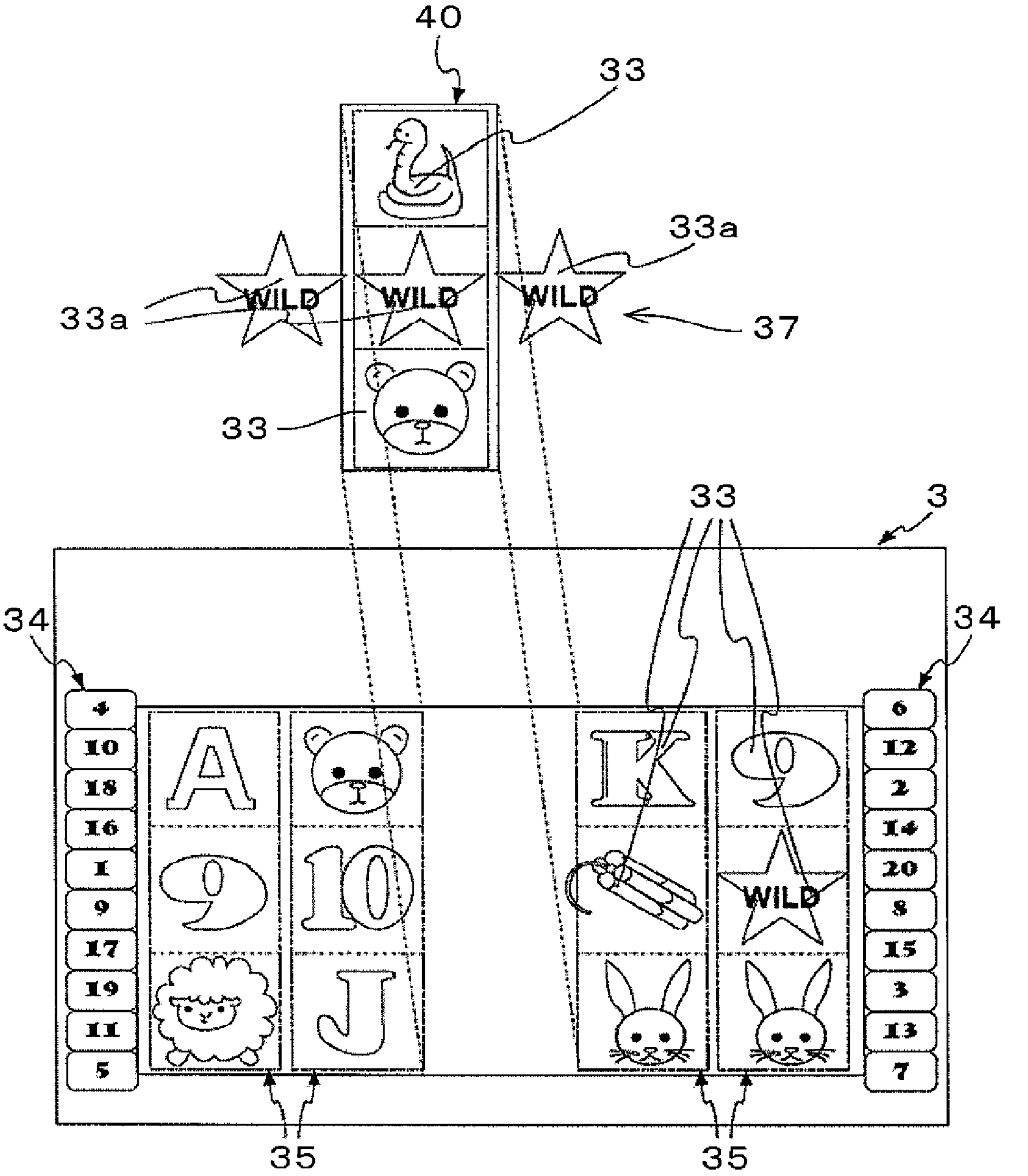
FIG. 14 is a diagram illustrating a status where an outer reel of FIG. 12 is synthesized with inner reels.
Figure 15:
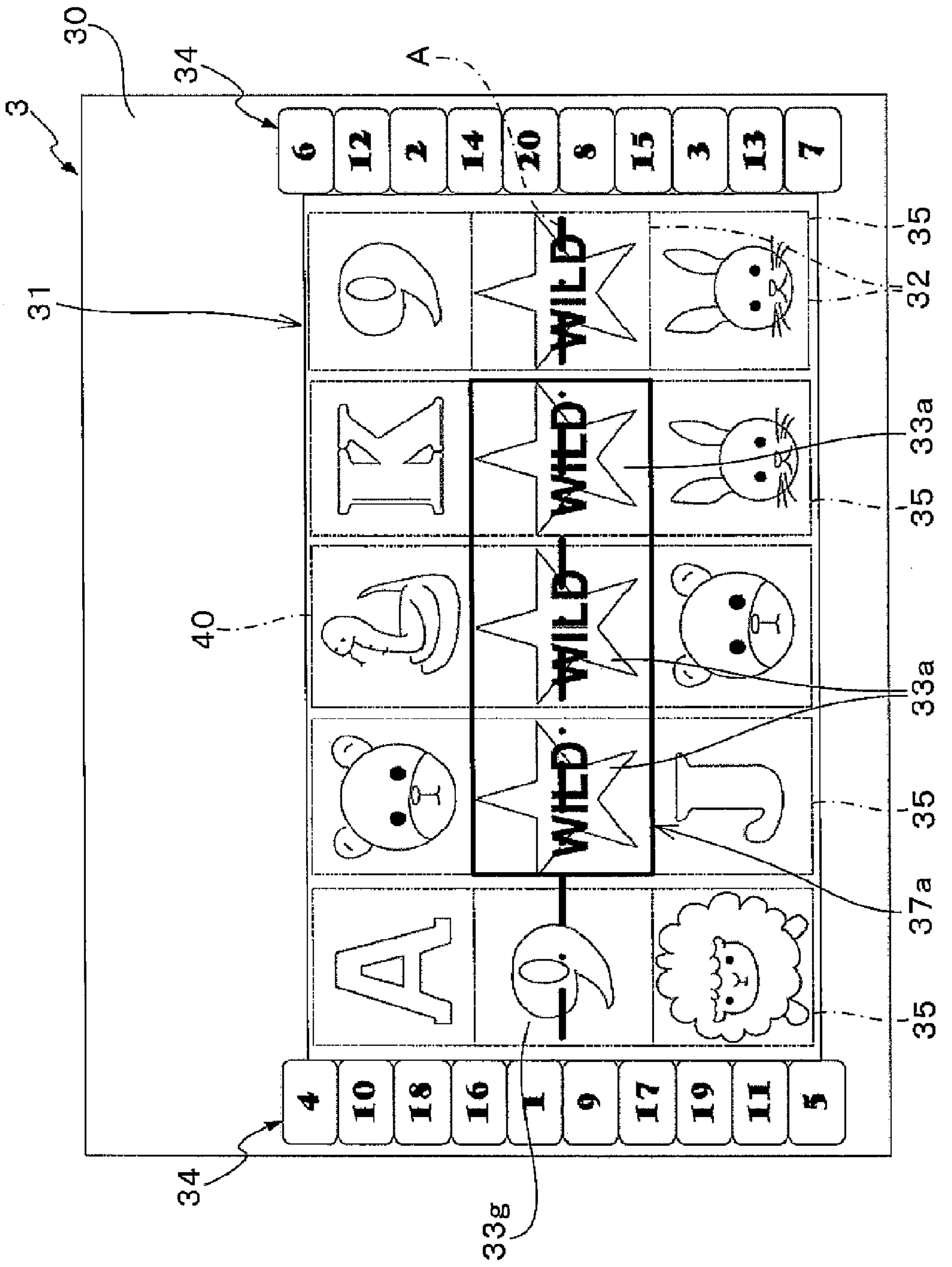
FIG. 15 is a diagram illustrating a symbol region when a winning pattern is formed using a symbol group provided in the outer reel of FIG. 11.
Figure 16:
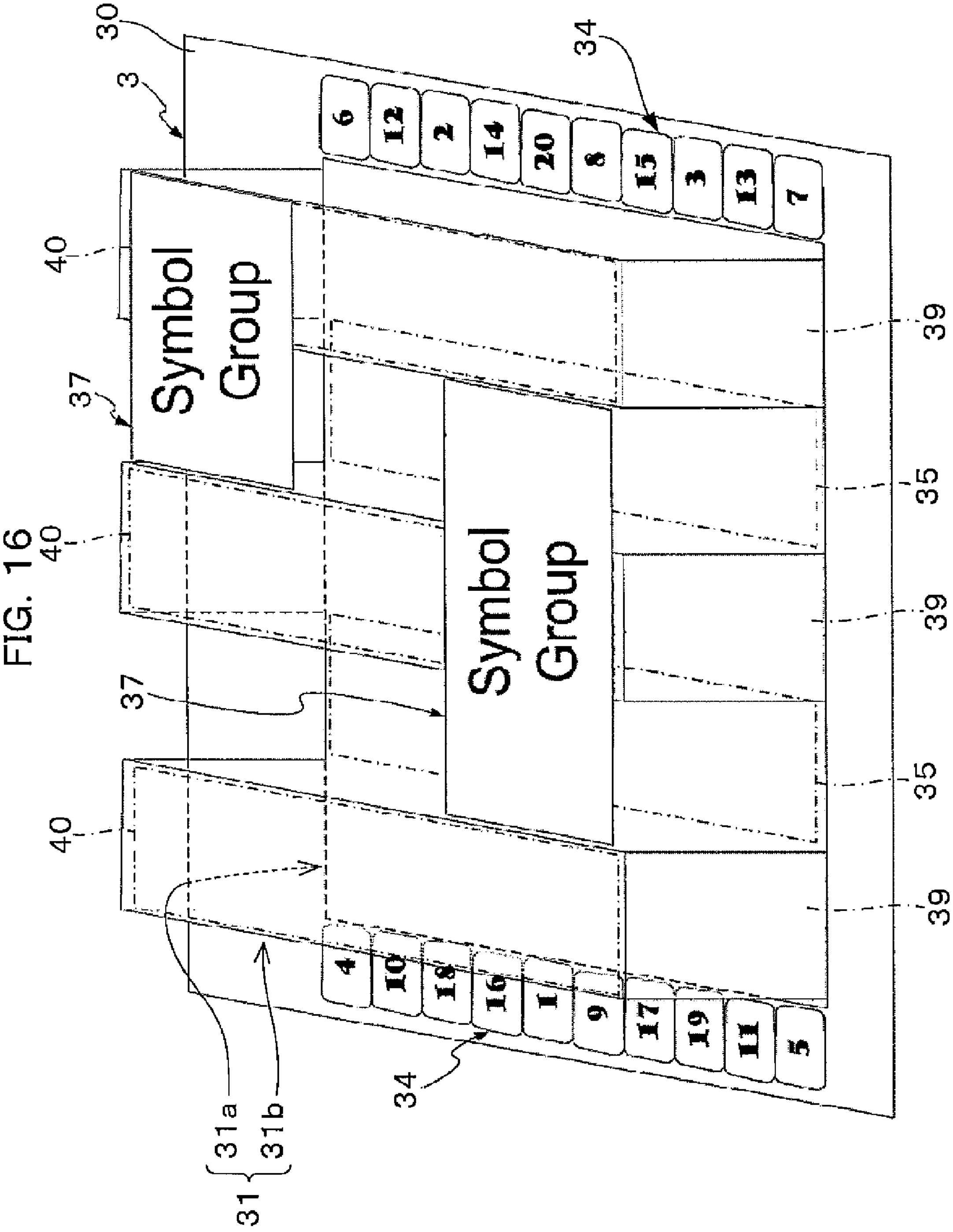
FIG. 16 is a diagram illustrating a modification of FIG. 12.

FIG. 14 illustrates a status where a portion of the outer reel 40, that is, one symbol group 37 and the anterior and posterior base portions 41 thereof are overlapped to the inner reels 35 disposed in the symbol region 31. Since the inner reels 35 are disposed in the lower first layer 31*a* and the outer reel 40 is disposed in the upper second layer 31*b*, the symbol group 37 of the outer reel 40 is disposed to cover the symbols 33 of the inner reels 35. For this reason, on the game screen 30 after the images of the reels 35 and 40 of the first and second layers 31*a* and 31*b* are synthesized, as illustrated in FIG. 15, the three WILD symbols 33*a* of the symbol group 37 are arranged in the row direction. In this case, if the valid line A is set to the central row, on the valid line A, the WILD symbol 33*a* of the inner reel 35 appears so as to be adjacent to the right side of the symbol group 37, and a symbol 33*g* where a numeral of 9 is displayed appears to be adjacent to the left side of the symbol group 37. Therefore, it is determined that a winning pattern where the five symbols 33*g* are arranged is formed. The number of outer reels 40 is not limited to one. As exemplified in FIG. 16, the plural outer reels 40 may be disposed in the second layer 31*b*. In the case where the plural outer reels 40 are disposed in the second layer 31*b*, there may be occurred the possibility that the symbol groups 37 overlap each other depending on the arrangement of the symbol groups 37. In such case, it is necessary to display one of the symbol group 37 prior to the other symbol group 37. Various measures can be used as to which symbol group the priority should be given. For example, the priority order may be determined in accordance with properties of the symbol groups, such that the priority is given to the symbol group 37 of the reel which is positioned on the left side in the symbol region 31. Alternatively, as to which group the priority should be given, a lottery may be carried out just before the symbol groups overlap each other. The priorities for the kinds of the symbols may be set in advance, and the symbol of high priority may be displayed preferentially to the symbol of low priority. In the second embodiment, the shape or the size of the symbol group 37 of the outer reel 40 may be appropriately changed, similar to the first embodiment. The symbols 33 that are disposed in the symbol group 37 may be appropriately changed.

Figure 17:
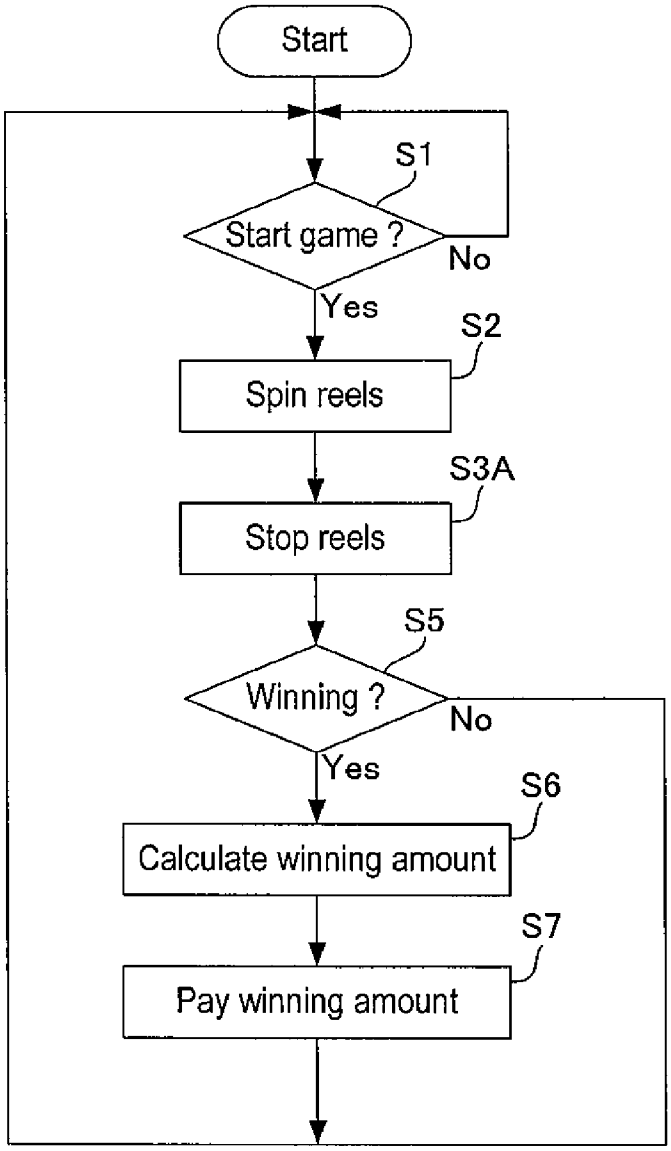
FIG. 17 is a flowchart illustrating a routine that is executed by a CPU according to the second embodiment to realize a slot game.

FIG. 17 is a flowchart illustrating a routine that is executed by the CPU 21 with an appropriate cycle to control display of the inner and outer reels 35 and 40, in the second embodiment. In the routine, steps S3 and S4 of the routine of FIG. 11 is replaced by step S3A. That is, the CPU 21 caused to start spinning the inner reels 35 and the outer reel 40 in step S2. Next, in step S3A, the CPU 21 stops the inner reels 35 and the outer reel 40. Next, the CPU 21 determines whether a combination of the symbols 33 appearing in the cells 32 of the symbol region 31 form a predetermined winning pattern. At this time, with respect to the cells 32 where the symbol group 37 of the outer reel 40 is stopped, instead of the symbols 33 of the inner reels 35, the symbols 33 of the outer reel 40 are selected as a determination target of a winning pattern. The following processes are the same as those of FIG. 11.

As described above, according to the above-described embodiments, since the symbols 33 of the same kind are disposed in the symbol group 37, the probability of forming a winning pattern can be increased and a player's expectation for winning can be heightened. In the above-described embodiments, the CPU 21 serves as a reel control unit and a winning determination unit.

The invention is not limited to the above-described embodiments, and various modifications and changes can be made. For example, in the above-described embodiments, the symbol group 37 is disposed to be closer to the side of the player (upper side) than the reels of the other layer. However, a relationship between the layers and the reels may be set such that the transparent regions are provided in the reels disposed in the upper layer and the symbol group on the reel disposed in the lower layer can be viewed through transparent regions. The number of reels that are disposed in the symbol region is not limited to the number of the above-described embodiments. In the above-described embodiments, all of the reels are configured as the virtual reels (video reels) that are displayed as the images on the screen of the display, but a portion or all of the reels may be configured as physical reels. For example, the inner reels may be configured as the physical reels, a transparent display may be disposed on the inner reels, and the outer reel as the virtual reel may be displayed on a screen thereof. Alternatively, the inner reels may be provided as virtual reels based on images and a physical reel may be disposed outside the inner reels. When the outer reel according to the first embodiment is provided as the physical reel, the transparent region may be formed of a transparent material. In the symbol group, the symbols of the same kind do not need to be continuously provided. Even when the symbols of the same kind are disposed through a gap corresponding to one or more cells, if at least one of the symbols overlaps the other reel of the other layer and the symbols are provided so as to integrally move and are in the state capable of being viewed from the player, a combination of the symbols serves as the symbol group according to the invention.

In the above embodiments, even though the plural symbols of the same kind are disposed in one symbol group, the invention is not limited to such embodiments. For example, in the case that the gaming machine where a winning combination is formed when symbols of different figures are arranged on a valid line in specific arrangement, at least two of these symbols may be disposed in the symbol group in arrangement according to the winning pattern. Namely, in the invention, it is sufficient that plural symbols capable of forming at least portion of a winning pattern are disposed in a symbol group. That is, the plural symbols may need to have a predetermined relationship allowing a winning pattern to be easily formed. As an example thereof, a combination of the WILD symbol and the other symbol, a combination of a special symbol solely providing a winning and the other symbol, a combination a special symbol capable of transforming to a symbol as same as the adjacent symbol and the other symbol or the like may be conceivable in the above embodiments. The symbol group may contain symbols having no relationship with forming of the winning pattern, so far as the remaining symbols in the symbol group can form at least portion of the winning pattern.

What is claimed is:

1. A gaming machine comprising:
- a display device;
- a processor;
- a user input device including an accepting device and a cashout device;
- the accepting device configured to accept an item associated with a monetary value, the monetary value establishing a credit balance, the credit balance being increasable and decreasable based at least on wagering activity; and
- the cashout device configured to receive an input to cause an initiation of a payout associated with the credit balance;
- the display having displayed thereon a plurality of cells in a symbol region, the cells being arranged in a predefined matrix, the matrix having a plurality of rows and a plurality of columns, the display including a plurality of reels, the plurality of reels including:
  - a plurality of first reels displayed within the symbol region, each of the first reels having a plurality of first symbols thereon, each first reel being associated with a predetermined column of the matrix; and,
  - a second reel having a first symbol group, a second symbol group, and a transparent region thereon, the first and the second symbol groups being composed of a plurality of symbol locations, each symbol location having an associated symbol, wherein the first symbol group includes a first set of adjacent symbol locations aligned with a first one of the columns of the matrix and a second set of adjacent symbol locations aligned with one of the rows; and,
- a reel control unit including the processor programmed to independently control the first reels and the second reel upon activation of the user input device, thereafter an outcome of a game is formed by the first reels and the second reel when the first reels and the second reel are in a stopped position, wherein a symbol within any symbol location of the symbol groups on the second reel in the outcome contained in the matrix overwrites any underlying symbol on the first reels, wherein the plurality of reels includes at least one of physical reels and video reels.

2. A gaming machine, as set forth in claim 1, wherein the first symbol group includes a different number of symbol locations than the second symbol group.

3. A gaming machine, as set forth in claim 1, wherein the first one of the columns of the matrix is the predetermined column of the matrix.

4. A gaming machine, as set forth in claim 1, wherein the first symbol group has a different shape than the second symbol group.

5. A gaming machine, as set forth in claim 1, wherein the at least one other symbol location is aligned with a second one of the columns of the matrix.

6. A gaming machine, as set forth in claim 1, wherein the first reel moves in a first direction.

7. A gaming machine, as set forth in claim 1, wherein the first direction is a vertical direction.

8. A gaming machine, as set forth in claim 6, wherein the second reel moves in a second direction.

9. A gaming machine, as set forth in claim 8, wherein the second direction is transverse the first direction.

10. A gaming machine, as set forth in claim 6, wherein the second reel moves in the first direction.

11. A gaming machine, as set forth in claim 1, wherein the symbol in each symbol location of the symbol group is the same.

12. A gaming machine, as set forth in claim 1, wherein the symbol in each symbol location of a corresponding symbol group is determined by lottery.

13. A gaming machine, as set forth in claim 1, further comprising a second first reel, the second first reel having a plurality of symbols, the second first reel being associated with a second predetermined column of the matrix.

14. A gaming machine, as set forth in claim 13, wherein the second one of the columns of the matrix being the second predetermined column of the matrix.

15. A gaming machine, as set forth in claim 14, wherein the outcome of the game is formed by the first reels and the second reel when the first reels and the second reel are in a stopped position, wherein the symbol within any symbol location of a corresponding symbol group on the second reel in the outcome contained in the matrix overwrites any underlying symbol on the first reels.

16. A gaming machine as set forth in claim 1, the second symbol group being composed of at least two adjacent symbol locations aligned with adjacent cells within a second one of the columns, each symbol location of the second symbol group having an associated symbol.

17. A gaming machine, as set forth in claim 16, wherein the outcome of the game is formed by the first reels and the second reel when the first reels and the second reel are in a stopped position, wherein the symbol within any symbol location of either symbol group on the second reel in the outcome contained in the matrix overwrites any underlying symbol on the first reels.

18. A gaming machine, as set forth in claim 1, wherein the first symbol group forms a predetermined pattern.

19. A gaming machine, as set forth in claim 18, wherein the first symbol group includes at least four symbol locations.

20. A gaming machine, as set forth in claim 18, wherein the predetermined pattern is one of: at least three adjacent symbol locations in a first direction, a square, a rectangle, at least three adjacent symbols arrange in the first direction and a transverse direction, L-shaped, and at least two non-adjacent symbols.

21. A gaming machine, as set forth in claim 18, wherein the game includes a valid line, wherein the predetermined pattern matches a shape of the valid line.

22. A gaming machine comprising:

a display device;

a processor;

a user input device including an accepting device and a cashout device;

the accepting device configured to accept an item associated with a monetary value, the monetary value establishing a credit balance, the credit balance being increasable and decreasable based at least on wagering activity; and the cashout device configured to receive an input to cause an initiation of a payout associated with the credit balance;

the display having displayed thereon a plurality of cells in a symbol region, the cells being arranged in a predefined matrix, the matrix having a plurality of rows and a plurality of columns the display including a plurality of reels, the plurality of reels including:

a plurality of inner reels, each inner reel having a plurality of symbols thereon and being associated with a predetermined column of the matrix; and, an outer reel having a first symbol group, a second symbol group, and a transparent region thereon, the first and the second symbol groups being composed of a plurality of symbol locations, each symbol location having an associated symbol, wherein the first symbol group a first set of adjacent symbol locations aligned with a first one of the columns of the matrix and a second set of adjacent symbol locations aligned with one of the rows; and, a reel control unit including the processor programmed to independently control the inner reels and the second reel upon activation of the user input device, thereafter an outcome of a game is formed by the inner reels and the outer reel when the inners reels and the outer reel are in a stopped position, wherein the symbol within any symbol location of the symbol groups on the outer reel in the outcome contained in the matrix overwrites any underlying symbol on the inner reels, wherein the plurality of reels includes at least one of physical reels and video reels.

23. A gaming machine, as set forth in claim 22, wherein the first symbol group includes a different number of symbol locations than the second symbol group.

24. A gaming machine, as set forth in claim 22, wherein the first symbol group has a different shape than the second symbol group.

25. A gaming machine, as set forth in claim 22, wherein the at least one other symbol location is aligned with a second one of the columns of the matrix.

26. A gaming machine, as set forth in claim 22, wherein the symbol in each symbol location of the symbol group is the same.

27. A gaming machine, as set forth in claim 22, wherein the symbol in each symbol location of the symbol group is determined by lottery.

28. A gaming machine as set forth in claim 22, the second symbol group being composed of at least two adjacent symbol locations aligned with adjacent cells within a second one of the columns, each symbol location of the second symbol group having an associated symbol.

29. A gaming machine, as set forth in claim 28, wherein the outcome of the game is formed by the inner reels and the outer reel when the inner reels and the outer reel are in a stopped position, wherein the symbol within any symbol location of either symbol group on the outer reel in the outcome contained in the matrix overwrites any underlying symbol on the first reel.

30. A gaming machine, as set forth in claim 22, wherein the first symbol group forms a predetermined pattern.

31. A gaming machine, as set forth in claim 30, wherein the first symbol group includes at least four symbol locations.

32. A gaming machine, as set forth in claim 30, wherein the predetermined pattern is one of: at least three adjacent symbol locations in a first direction, a square, a rectangle, at least three adjacent symbols arrange in the first direction and a transverse direction, L-shaped, and at least two non-adjacent symbols.

33. A gaming machine, as set forth in claim 30, wherein the game includes a valid line, wherein the predetermined pattern matches a shape of the valid line.

* * * * *